(12) United States Patent
Bates et al.

(10) Patent No.: US 12,552,604 B2
(45) Date of Patent: Feb. 17, 2026

(54) MULTI-FUNCTION INVENTORY HANDLING STATION ASSEMBLY

(71) Applicant: Ocado Innovation Limited, Hatfield (GB)

(72) Inventors: Martyn Bates, Hatfield (GB); Andrew Ingram-Tedd, Hatfield (GB); Laura Maestro, Hatfield (GB); Lewis Goddard, Hatfield (GB); Keith Habben, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 314 days.

(21) Appl. No.: 18/000,015

(22) PCT Filed: May 20, 2021

(86) PCT No.: PCT/EP2021/063417
§ 371 (c)(1),
(2) Date: Nov. 28, 2022

(87) PCT Pub. No.: WO2021/239559
PCT Pub. Date: Dec. 2, 2021

(65) Prior Publication Data
US 2023/0219753 A1 Jul. 13, 2023

(30) Foreign Application Priority Data

May 29, 2020 (GB) ..................................... 2008129

(51) Int. Cl.
*B65G 1/04* (2006.01)
*B65G 1/137* (2006.01)

(52) U.S. Cl.
CPC ......... *B65G 1/0478* (2013.01); *B65G 1/0464* (2013.01); *B65G 1/0485* (2013.01); *B65G 1/1378* (2013.01); *B65G 2201/0238* (2013.01)

(58) Field of Classification Search
CPC .. B65G 1/0478; B65G 1/0464; B65G 1/0485; B65G 1/1378; B65G 2201/0238
See application file for complete search history.

(56) References Cited

U.S. PATENT DOCUMENTS

| 4,983,091 A | 1/1991 | Lichti, Sr. et al. |
| 2011/0002761 A1 | 1/2011 | Aimable-Lima et al. |
| (Continued) | | |

FOREIGN PATENT DOCUMENTS

| EP | 1366442 A2 | 12/2003 |
| EP | 2375386 A2 | 10/2011 |
| (Continued) | | |

OTHER PUBLICATIONS

Office Action issued on Aug. 14, 2023, by the Great Britain Patent Office in corresponding Great Britain Patent Application No. GB2311214.7. (3 pages).

(Continued)

*Primary Examiner* — Saul Rodriguez
*Assistant Examiner* — Ashley K Romano
(74) *Attorney, Agent, or Firm* — Buchanan Ingersoll & Rooney.P.C

(57) ABSTRACT

An inventory handling station assembly for a storage and retrieval system is disclosed. A grid framework structure includes a plurality of upright columns for one or more containers to be stacked, the plurality of upright columns being interconnected at their top ends by grid members which support first and second sets of tracks for a load handling device to move containers on the grid framework structure. A supply zone includes at least one vertical chute. A buffer zone vertically accumulates containers and includes at least one bin lift device. An access station is intermediate (Continued)

of the supply zone. A conveyor system conveys containers 10 from the supply zone to the buffer zone via the access station.

25 Claims, 15 Drawing Sheets

(56) References Cited

U.S. PATENT DOCUMENTS

| | | | |
|---|---|---|---|
| 2018/0086562 A1* | 3/2018 | Pompen | G06Q 10/083 |
| 2018/0162639 A1 | 6/2018 | Ingram-tedd et al. | |
| 2019/0300286 A1 | 10/2019 | Hognaland et al. | |
| 2020/0324974 A1* | 10/2020 | Gorman | B65G 11/023 |
| 2021/0032026 A1 | 2/2021 | Lindbo et al. | |
| 2021/0387808 A1* | 12/2021 | Kalouche | G06Q 10/083 |

FOREIGN PATENT DOCUMENTS

| | | |
|---|---|---|
| GB | 240712 A | 10/1925 |
| GB | 2524383 A | 9/2015 |
| GB | 2571827 A | 9/2019 |
| JP | H07101515 A | 4/1995 |
| JP | 2002154615 A | 5/2002 |
| JP | 2018520965 A | 8/2018 |
| JP | 2018158836 A | 10/2018 |
| KR | 1020180016422 A | 2/2018 |
| WO | 1989007563 A1 | 8/1989 |
| WO | 2015019055 A1 | 2/2015 |
| WO | 2015185628 A2 | 12/2015 |
| WO | 2016198467 A1 | 12/2016 |
| WO | 2017211640 A1 | 12/2017 |
| WO | 2018069282 A1 | 4/2018 |
| WO | 2019206971 A1 | 10/2019 |
| WO | 2020074717 A1 | 4/2020 |

OTHER PUBLICATIONS

First Office Action issued on Jan. 9, 2024, by the Chinese Patent Office in corresponding Japanese Patent Application No. 2022-573548, and an English Translation of the Office Action. (12 pages).

Office Action issued on May 7, 2024, by the Canadian Patent Office in corresponding Canadian Patent Application No. 3,185,321. (5 pages).

Office Action (Examination Report No. 1) issued on Dec. 15, 2023, by the Australian Patent Office in corresponding Australian Patent Application No. 2021278253. (6 pages).

Combined Search and Examination Report under Sections 17 and 18(3) for British Patent Application No. 2107212.9 dated Jun. 29, 2022.

Combined Search and Examination Report under Sections 17 and 18(3) for British Patent Application No. 2107212.9 dated Nov. 12, 2021.

Search Report under Section 17 for British Patent Application No. 2008129.5 dated Mar. 10, 2021.

International Search Report (PCT/ISA/210) and Written Opinion (PCT/ISA/237) mailed on Jul. 29, 2021, by the European Patent Office as the International Searching Authority for International Application No. PCT/EP2021/063417. (15 pages).

Office Action issued on Feb. 12, 2025 by the Korean Patent Office in corresponding Korean Application No. 10-2022-7046351 (12 pages) corresponding to Applicant's U.S. Appl. No. 18/000,015.

Office Action issued on May 23, 2025 by the Chinese Patent Office in corresponding Chinese Application No. 202180038011.7 (10 pages) corresponding to Applicant's U.S. Appl. No. 18/000,015.

Office Action issued on Aug. 13, 2025 by the Australian Patent Office in corresponding Australian Application No. 2024204590 (6 pages) corresponding to Applicant's U.S. Appl. No. 18/000,015.

* cited by examiner

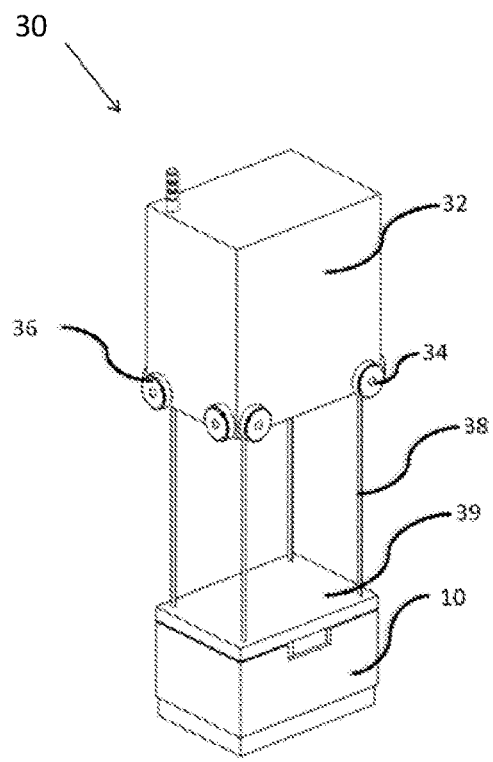
Figure 4
(PRIOR ART)
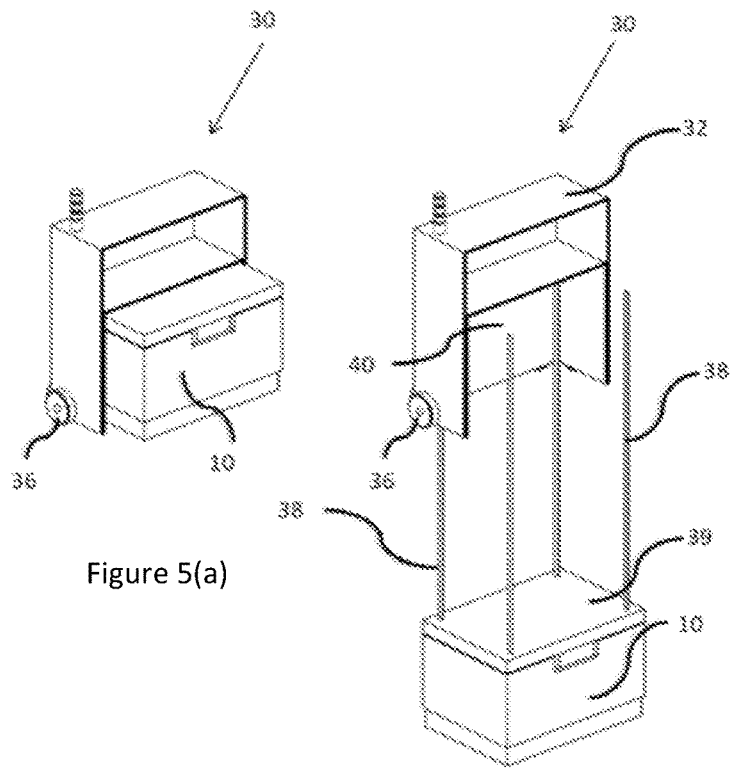
Figure 5(a)
Figure 5(b)
(PRIOR ART)

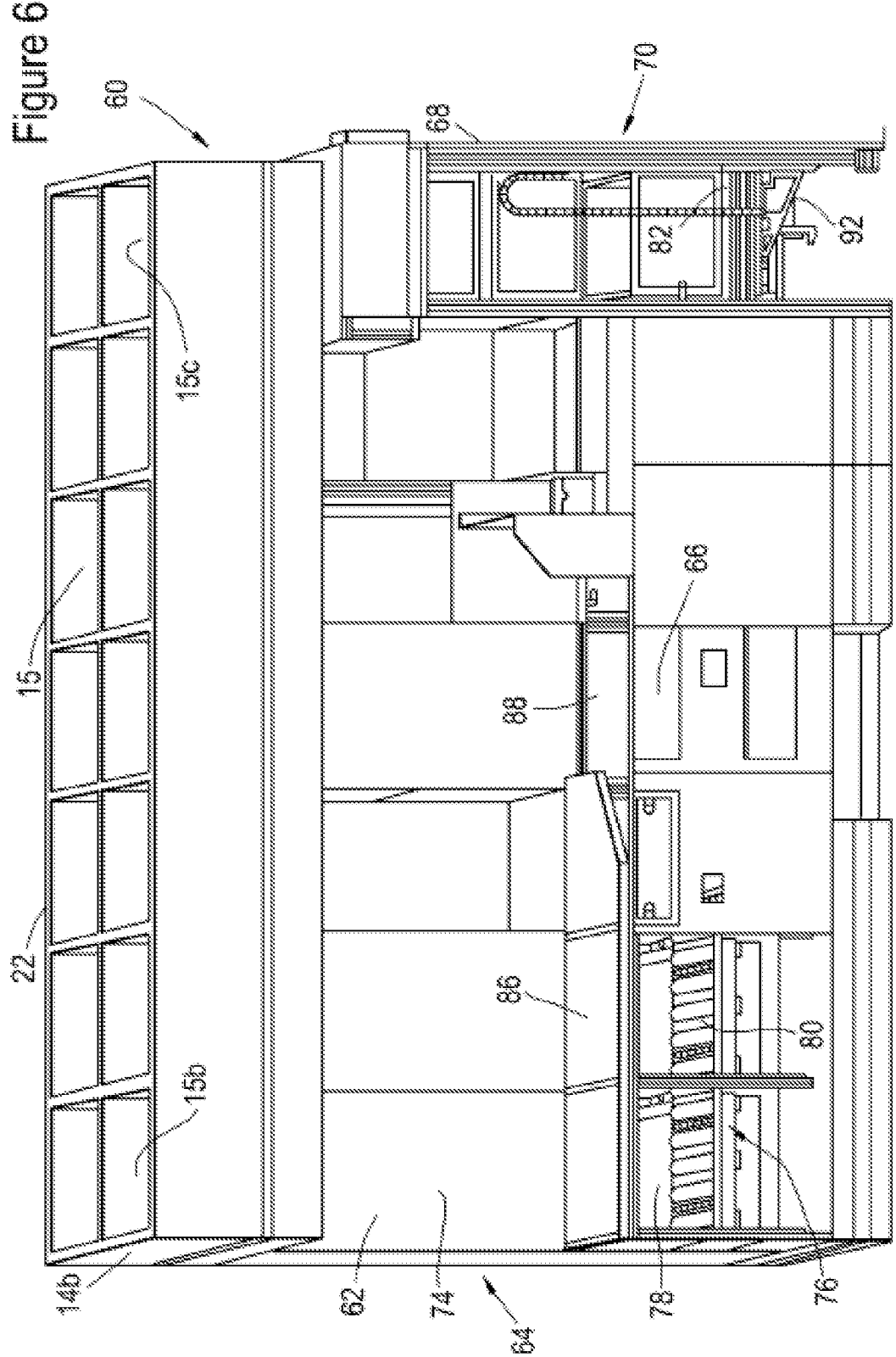

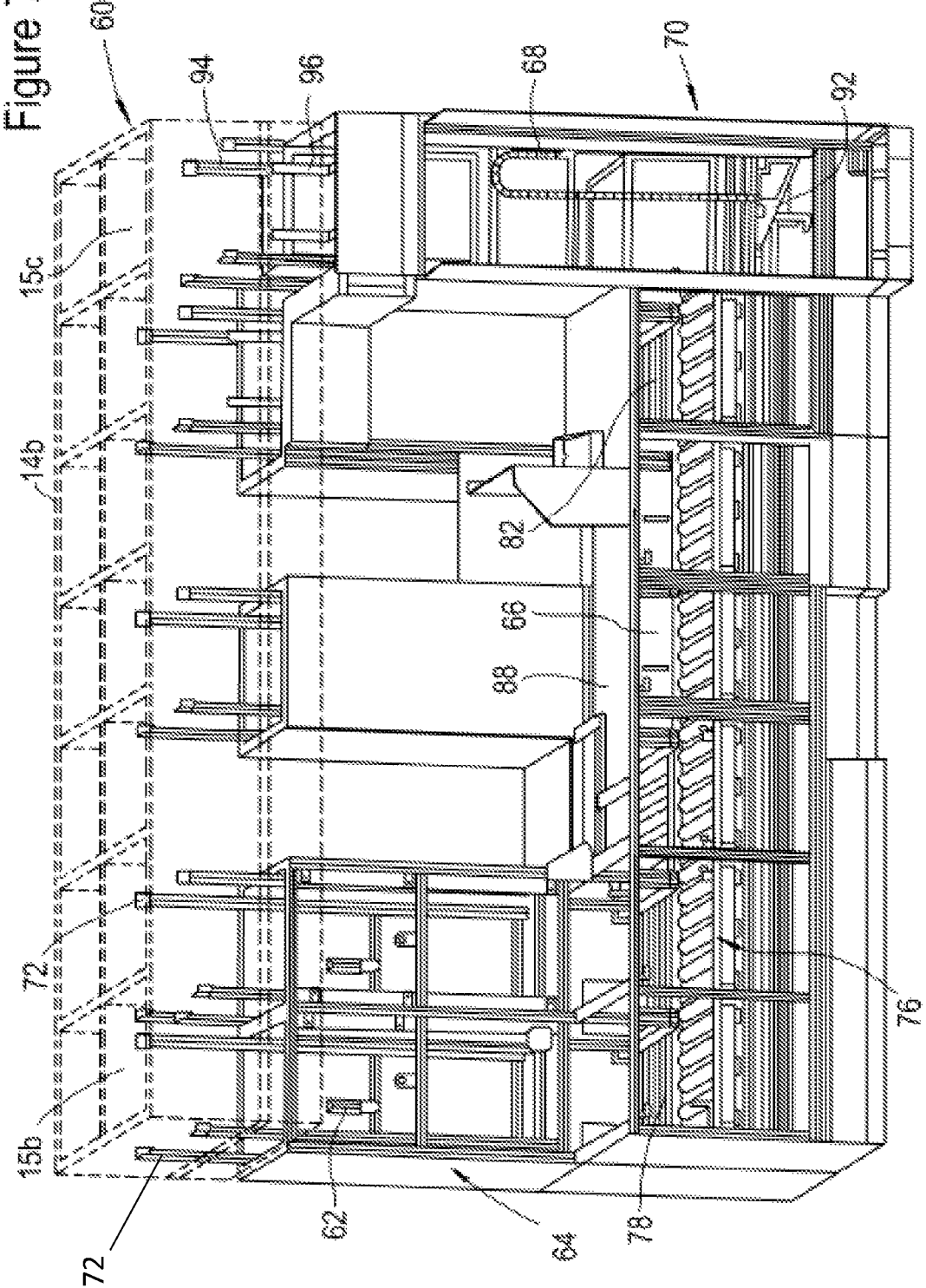

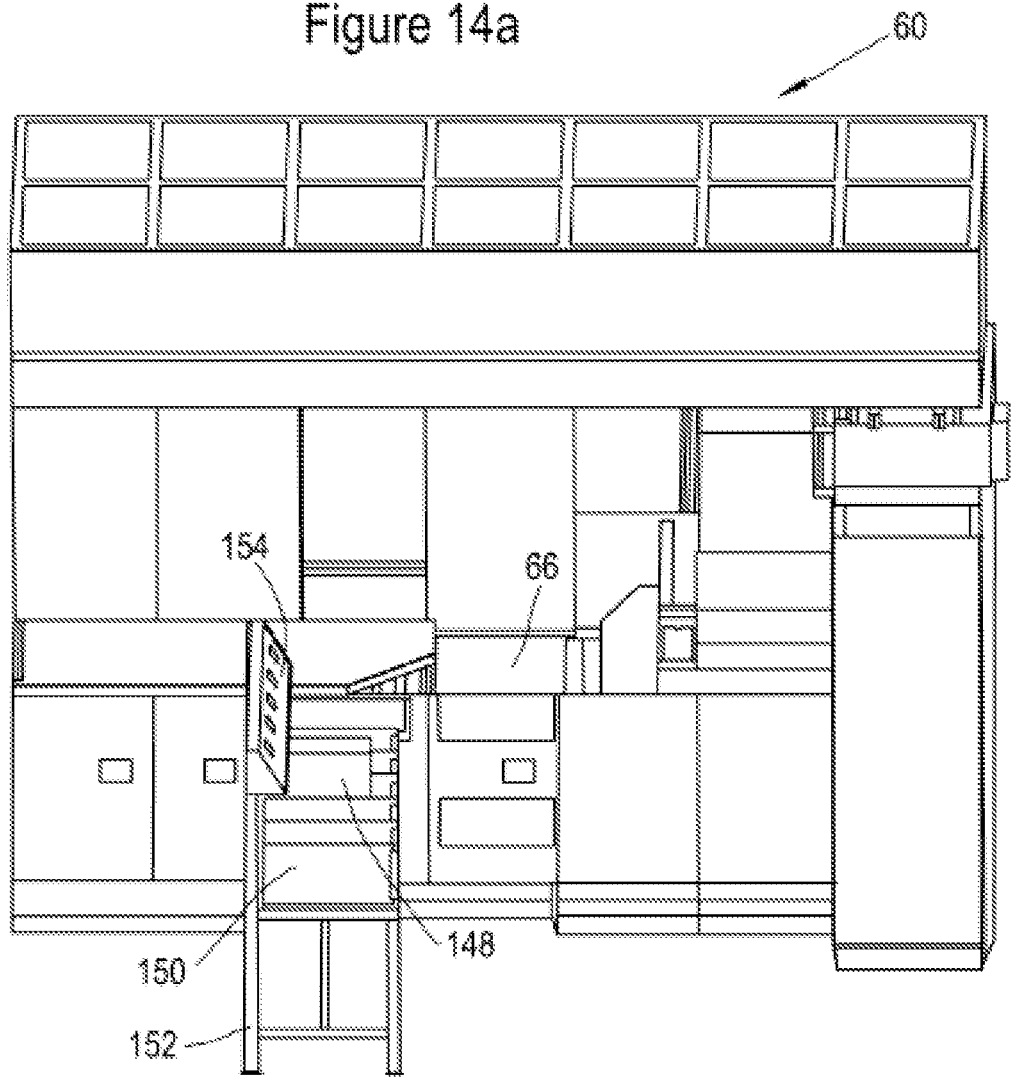

MULTI-FUNCTION INVENTORY HANDLING STATION ASSEMBLY

FIELD OF INVENTION

The present invention relates to the field of a storage and retrieval system for handling storage containers or bins stacked in a grid framework structure, more particularly to a multi-function inventory handling station assembly for picking or supplying one or more items or goods to or from the storage and retrieval system comprising the grid framework structure.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as bins or containers 10, are stacked on top of one another to form stacks 12. The stacks 12 are arranged in a grid framework structure 14 in a warehousing or manufacturing environment. The grid framework is made up of a plurality of storage columns or grid columns 15. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The grid framework structure 14 comprises a plurality of upright members or upright columns 16 that support horizontal members 18, 20. A first set of parallel horizontal grid members 18 is arranged perpendicularly to a second set of parallel horizontal grid members 20 to form a plurality of horizontal grid structures supported by the upright members 16. The members 16, 18, 20 are typically manufactured from metal and typically welded or bolted together or a combination of both. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 includes rails 22 arranged in a grid pattern across the top of the stacks 12. Referring additionally to FIG. 3, the rails 22 support a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device 30 shown in FIGS. 4 and 5 comprises a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting a pair of wheels on the front of the vehicle body 32 and a pair of wheels 34 on the back of the vehicle 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction. Each of the set wheels are driven to enable movement of the vehicle in X and Y directions respectively along the rails. One or both sets of wheels can be moved vertically to lift each set of wheels clear of the respective rails, thereby allowing the vehicle to move in the desired direction.

The load handling device 30 is equipped with a lifting device or crane mechanism to lift a storage container from above. The crane mechanism comprises a winch, a tether or cable 38 wound on a spool or reel (not shown) and a grabber device 39. The lifting device or crane mechanism comprise a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess 40, in the lower part of the load handling device. The recess is sized to accommodate the container 10 when it is lifted by the crane mechanism, as shown in FIG. 5 (a and b). When in the recess, the container is lifted clear of the rails beneath, so that the vehicle or load handling device can move laterally to a different location. On reaching the target location, for example another stack, an access point in the storage system or a conveyor belt, the bin or container can be lowered from the container receiving portion and released from the grabber device.

Thus, upon receipt of a customer order, a load handling device operative to move on the tracks is instructed to pick up a storage bin containing the item of the order from a stack in the grid framework structure and transport the storage bin to a pick station whereupon the item can be retrieved from the storage bin. Typically, the load handling device transports the storage bin or container to a bin lift device that is integrated into the grid framework structure. A mechanism of the bin lift device lowers the storage bin or container to a pick station. At the pick station, the item is retrieved from the storage bin. Picking can done manually by hand or by a robot as taught in GB2524383 (Ocado Innovation Limited). After retrieval from the storage bin, the storage bin is transported to a second bin lift device whereupon it is lifted to grid level to be retrieved by a load handling device and transported back into its location within the grid framework structure. A control system and a communication system keeps track of the location of the storage bins and their contents within the grid framework structure. As individual containers are stacked in vertical layers, their locations in the grid framework structure or "hive" may be indicated using co-ordinates in three dimensions to represent the load handling device or a container's position and a container depth (e.g. container at (X, Y, Z), depth W). Equally, locations in the grid framework structure may be indicated in two dimensions to represent the load handling device or a container's position and a container depth (e.g. container depth (e.g. container at (X, Y), depth Z). For example, Z=1 identifies the uppermost layer of the grid, i.e. the layer immediately below the rail system, Z=2 is the second layer below the rail system and so on to the lowermost, bottom layer of the grid.

Equally when stocking the storage system with items or replenishing the inventory of the storage system, items delivered from a supplier is transported to a decant station or a supply station. Here, the items are removed from their packaging and depending on the type of item, registered with a unique stock keeping unit or SKU, and placed in storage bins at the decant station. At the decant station, the storage bins are transported to a bin lift device whereupon it is lifted to grid level to be retrieved by a load handling device and transported to a location within the grid framework structure.

WO2017/211640 (Autostore Technology AS) describes a storage system for storing product items, comprising a grid structure, a number of storage bins configured to be stored in vertical compartments in the grid structure, where each storage bin is configured to contain at least one product item, where the storage system comprises a picking and/or supply station; and where the storage system comprises a conveyor system configured to convey a storage bin from a first position to a second position and further to a third position. The conveyor system comprises a first, tiltable conveyor configured to convey the storage bin from the first position to the third position via the second position. The picking and/or supply station is provided adjacent to the grid structure. The first and third positions are provided below two different vertical compartments in the grid structure. The tiltable conveyor comprises a hydraulic piston and cylinder mechanism for lowering and elevating a conveyor. The tiltable conveyor supports a storage bin in an inclined position in the second position so allowing items to be manually picked from the storage bin. Once picked, the tiltable conveyor is tilted down and the storage bin is transported to a third position allowing for the storage bin to be retrieved by a load handling device operative on the grid structure. Lowering and elevating rollers using a hydraulic piston and cylinder mechanism not only suffers from alignment issues to make sure that a storage bin is able to be transported from the first position to the third positon via the second positon but the use of such a tiling device adds a level of complexity to the picking station.

WO2018/069282 (Autostore Technology AS) describes a picking/supply station assembly for a storage system comprising a grid structure. The picking/supply station assembly comprises a first bin lift device, a second bin lift device and a picking/supply station, wherein the first bin lift device is arrangeable to receive a storage bin from the at least one vehicle at the top level of the grid structure and deliver the storage bin to the picking/supply station. The picking/supply station comprises a bin transport assembly arranged to move the storage bin from the first bin lift device to the second bin lift device; and the second bin lift device is arranged to receive the storage bin from the bin transport assembly and is arrangeable to convey the storage bin to the top level of the grid structure. The bin lift device is arranged in the storage system to receive a storage bin from a vehicle or load handling device at the top level of the grid structure and to convey the bin down in a vertical direction to a supply/picking station arranged at the ground floor in the building wherein the storage system is installed. In use, a first storage bin is initially placed on the lifting arms at the top level of the grid and lowered towards the first conveyor unit. The space between the lifting arms are wide enough to allow the first conveyor unit to pass between them. During passing, the first storage bin will remain on the first conveyor unit, while the lifting arms enters their lowermost position. The first storage bin is then transported out of the first lifting device by the first conveyor unit. After exit of the storage bin from the first bin lift device, the lifting arms may return to the top level for retrieving a second storage bin. The first and second bin lift devices are integrated into the grid framework structure and therefore, the pick station forms an integral part of the grid framework structure.

A similar bin lift mechanism integrated into the grid framework structure to supply a pick station is described in WO 2020/074717 (Autostore Technology AS). WO 2020/074717 (Autostore Technology AS) describes an access station for picking storage containers, comprising: a picking zone, at least one conveyor arranged to transport storage containers from an entry position through said picking zone and to an exit position, wherein the access station comprises: at least one tilting device arranged to tilt a storage container at least in the picking zone. Like, the teaching in WO2017/211640 (Autostore Technology AS), the tilting device tilts a storage container in the picking zone when the access station is to be operated with a picking person, thereby providing the ergonomic benefits of tilting. Storage containers are received at the back side of the access station at an entry position located on an entry conveyor. The entry position is configured for connection to another conveyor, for example a storage system conveyor which transports storage containers to and from the entry position. Upon entering the access station, the entry conveyor transports the storage container in a transport direction to an exit conveyor via a tiltable access conveyor in a picking zone at the front of the access station. Entry and exit of the storage containers to the grid framework structure is via the rear of the access station. The entry position and the exit position may be each connected to a storage system conveyor.

In a storage grid, a majority of the grid columns are storage columns, i.e. grid columns where storage containers are stored in stacks. However, a grid normally has at least one grid column which is used not for storing storage containers, but which comprises a location where the container handling vehicles can drop off and/or pick up storage containers so that they can be transported to a second location (not shown in the prior art figures) where the storage containers can be accessed from outside of the grid or transferred out of or into the grid. Within the art, such a location is normally referred to as a "port" and the grid column in which the port is located may be referred to as a "delivery column". The storage grids comprise two delivery columns. A first delivery column may for example comprise a dedicated drop-off port where the container handling vehicles or load handling vehicles can drop off storage containers to be transported through the delivery column and further to an access or a transfer station, and a second delivery column may comprise a dedicated pick-up port where the container handling vehicles can pick up storage containers that have been transported through the second delivery column from an access or a transfer station. Storage containers are fed into the access station via the first delivery column and exit the access station via the second delivery column. However, not only does this arrangement take away one or more grid columns for the storage of containers but also restricts the access station to be tied to particular grid columns in the grid framework structure in order to supply and retrieve storage containers to and from the access station.

Whilst the access stations described above are suitable to fulfil orders that is generally planned well in advance, e.g. a couple of days upon receipt of a customer order, there is no system available for the immediate fulfilment of a customer order, i.e. within a couple of hours upon receipt of a customer order. This is particularly the case where the order comprises a small number of generally staple items, e.g. bread or milk, and can also include the impulsive buying behaviour of a customer which have a tendency to buy goods without planning in advance. When a customer takes such buying decisions at the spur of the moment, it is usually, triggered by emotions and feelings, i.e. making an unplanned purchase. Typically, convenience stores that stock a wide range of everyday items such as coffee, groceries, snack foods, confectionery, soft drinks, tobacco products, over-the-counter drugs, toiletries, newspapers, and magazines tend are best placed to cater for such an impulsive market, With the market for convenience stores and impulsive purchase increasing, an access station is thus required to fulfil an order for immediate dispatch.

An access station is thus required, that:
i) is flexible and can double up as a pick station and/or a supply station,
ii) is portable so that it can be retrofitted to any grid framework structure,
iii) can work alongside a pick station or a supply station in a storage system to fulfil orders for immediate dispatch.

This application claims priority from GB application number GB2008129.5 filed on 29 May 2020, the contents being herein incorporated by reference.

SUMMARY OF THE INVENTION

The present invention has mitigated the above problem by providing an inventory handling station assembly for a storage and retrieval system, the storage and retrieval system comprising a grid framework structure comprising:
a plurality of upright columns lying in one or more vertical planes and arranged to form a plurality of grid columns for one or more containers to be stacked between and be guided by the plurality of upright columns in a vertical direction, the plurality of upright columns are interconnected at their top ends by a first set of grid members extending in a first direction and a second set of grid members extending in a second direction, the second set of grid members running transversely to the first set of grid members in a substantially horizontal plane to form a grid comprising a plurality of grid cell or grid spaces;
the first and the second set of grid members supports a first and a second set of tracks respectively at an upper level of the grid framework structure for a load handling device to move one or more containers on the grid framework structure, wherein the inventory handling station assembly comprises:
i) a supply zone comprising at least one vertical chute configurable to cooperate with at least one upright column, the at least one vertical chute having a first opening for receiving a container lowered by at least one load handling device through a grid cell and a second opening to allow the container to exit from the supply zone;
ii) a buffer zone for vertically accumulating one or more containers comprising at least one bin lift device, each of the at least one bin lift device being arrangeable to upwardly lift a container towards the grid such that, in use, the container can be retrieved by the least one load handling device,
iii) an access station intermediate of the supply zone and the buffer zone to enable access to one or more containers exiting the supply zone,
iv) a conveyor system configured to convey one or more containers from the supply zone to the buffer zone via the access station.

For the purposes of describing the invention, the terms "grid framework structure" and "framework structure" are used interchangeably, to mean the three-dimensional structure for the storage of containers. For the purposes of describing the invention, the terms "grid" and "grid structure" are used interchangeably, to mean the two-dimensional structure formed by the first and second sets of horizontal members. The two-dimensional grid forms the top layer of the three-dimensional grid framework structure.

In comparison to an access station that is integrated into the grid framework structure of a storage system described in the art, the inventory handling station assembly of the present invention is a separate standalone station that is able to receive storage containers or bins from a load handling device operative on the grid framework structure. The grid framework structure is able to cooperate with the inventory handling station assembly such that one or more storage bins or containers can be lowered into one or more chutes of the supply zone. Equally, one or more bin lift devices of the buffer zone are able to vertically accumulate the storage bins or containers prior to being picked up by a load handling device operative on the grid. A drop off port in the grid can cooperate with a delivery channel in the grid framework structure through which one or more storage containers are transported through the chute for supplying one or more storage containers to the supply zone. Equally, a pick up port in the grid can cooperate with a retrieval channel in the grid framework structure through which one or more storage containers can be picked up from the bin lift device in the buffer zone. Storage bins or containers are fed into the supply zone via the at least one chute and is conveyed to the buffer zone where it is vertically accumulated to be picked up by a load handling device operative on the grid framework structure, i.e. on the tracks. For the purpose of the present invention "vertical chute" and "chute" are used interchangeably throughout the description to mean the same feature.

The supply zone, the access station, buffer zone and the conveyor system are all of a modular construction and can easily be retrofitted to an existing grid framework structure. The one or more chutes allow a load handling device operative on the grid framework structure to lower a storage bin under gravity and then transport it to an access station, where an operator or a robotic device can gain access to the contents of the storage container. The access station according to an aspect of the present provides a solution which is flexible, as it may be operated both as a pick station where one or more items are picked from a storage container and a restock station (also known as a decant station) where one or more items are deposited into a storage container. For the purpose of the present invention, the term "load handling device" and "bot" are used interchangeably throughout the description to mean the same feature.

Storage bins or containers delivered to the supply zone is transported to the buffer zone via the access station by a conveyor system. A storage bin or container is paused at the picking station and an operator selects a required item from a storage bin or container and places it in a customer delivery bin or container. At the buffer zone, the bin lift device lifts a storage bin or container towards the grid such that a load handling device operative on the upper level can retrieve the container. This allows one or more storage bins or containers to be vertically accumulated in the buffer zone. Preferably, the bin lift device lifts the storage bin or container to an uppermost level in the buffer zone above the conveyor system. More preferably, a load handling device operative at the upper level is able to grab the storage bin or container in the buffer zone and subsequently, lift the storage bin or container into a container receiving space of the load handling device.

Preferably, the conveyor system comprises an entry conveyor unit, an exit conveyor unit and an at least one access conveyor unit, the entry conveyor unit being arranged in the supply zone and arranged to transport a storage bin or container in a first direction or first transport direction from the second opening of the at least one vertical chute to the at least one access conveyor unit. The exit conveyor unit being arranged in the buffer zone and arranged to transport a storage bin or container from the at least one access conveyor unit to the buffer zone in a second direction or second transport direction, and wherein the at least one access conveyor unit being arranged to transport a container from the supply zone to the buffer zone in a third direction or third transport direction. The three conveyor units provide flexibility in terms of reducing the footprint of the inventory handling station assembly to transport one or more storage bins or containers from the supply zone to the buffer zone via the access station in multiple transport directions. For the purposes of this description, the terms "conveyor" and "conveyor unit" will be used interchangeably. The terms "direction" and "transport direction" are used interchangeably, and refer to the direction of transport of a conveyor or conveyor unit. The terms "first transport direction" and "second transport direction" are used to disambiguate from the terms "first direction" and "second direction" used above with reference to the first and second sets of grid members.

In an aspect of the present invention, the entry conveyor unit and the exit conveyor are arranged such that the first transport direction of the entry conveyor is opposite and parallel to the second transport direction of the exit conveyor and wherein the third transport direction of the at least one access conveyor unit is substantially orthogonal to both the first transport direction and the second transport direction of the entry conveyor unit and the exit conveyor respectively. Here, the exit out of the at least one chute of the supply zone and the entry into the at least one bin lift device face in the same direction, in that they both respectively expel or receive a storage bin or container in equal but opposite directions. The at least one access conveyor unit is orthogonal to both the entry conveyor unit and the exit conveyor unit. Thus, the storage bins or containers travel in a U shaped direction through the conveyor system from entry into the supply zone through the access station and exit into the buffer zone. As a result of this configuration, the storage bins or containers change direction twice.

In another aspect of the present invention, the conveyor system is arranged such that the first transport direction of the entry conveyor is orthogonal to both the second transport direction of the exit conveyor and the third transport direction of the at least one access conveyor. In this aspect of the present invention, the storage bins travel in an L shaped direction from entry into the supply zone and in a horizontal direction through the access station and subsequently exit the access station into the buffer zone. As a result of this configuration, the storage bins or containers change direction once as they enter the at least one access conveyor unit. Both configurations of the conveyor systems maximises throughput of the storage bins or containers through the inventory handling station assembly over a relatively small footprint in comparison to the grid framework structure. To further increase the throughput of storage bins or containers through the inventory handling station assembly, the at least one bin lift device is arranged such that some storage bins or containers travel in a U-shaped path and the remainder travel in a L-shaped path, i.e. using both paths to increase the throughput of storage bins or containers through the inventory handling station assembly.

Preferably, the access station of the inventory handling station assembly of the present invention doubles up as a supply station or decant station wherein inventory stored in the grid framework structure is replenished with fresh stock. In this configuration, the access station functions as a decant station where fresh stock are fed into the storage bins or containers that arrives from the supply zone to the buffer zone and subsequently allocated to a designated vertical storage column or grid column within the grid framework structure by a load handling device operative on the grid framework structure. To keep a record of stock or inventory stored in the storage and retrieval system (i.e. grid framework structure), preferably the at least one access conveyor unit comprises a load cell for weighing a container. Preferably, the load cell is arranged below the at least one access conveyor unit. More preferably, the load cell is arranged below the at least one access conveyor unit such that the load cell is at the access station. When operated as a pick station, the load cell measures the weight of a storage container in the access station each time an item is removed from the storage container. Optionally, the one or more storage bins comprises a label readable by a user interface for establishing the identity of each of the one or more storage bins as it paused at the pick station. This allows a stock control system to identify and correlate the contents of the storage bins or containers to the storage bins or containers stored in the grid framework structure. Optionally, the label of one or more of the storage bins can be a barcode, 1-D barcode, 1 2-D barcode, or a QR code or a RFID tag. A handheld scanner can be used to identify the identification of one or more of the storage bins and the stock control system can correlate the contents of the one or more storage bins or containers to the identification of the storage bins or containers themselves. The weight readings are recorded, together with the identification of the storage bin or container in an inventory database or stock database, and the data is used to monitor and control the amount of stock in the storage system. For example, when the weight of a particular storage bin is less than its allocated predetermined weight, this will provide information to the stock control system that the storage bin or container can accept more items. Preferably, the predetermined weight is between 15 kg to 50 kg, more preferably 20 kg to 40 kg. An inventory database or stock database is created recording the weight of each of the storage bins or containers and their contents in the grid framework structure. The stock control system is used to keep track of the location of respective storage bins or containers and the contents of each of the storage bins in the grid framework structure. For the purposes of this description, the terms "inventory database" and "stock database" will be used interchangeably.

When the access station is operated as a supply station, the load cell measures the weight of a storage bin or container each time stock is added to the storage container. The lifting mechanism of the load handling device comprising a grabber device is rated to lift a predetermined weight beyond which the lifting mechanism comprising one or more motors would be put under undue strain. To make sure that the weight of the storage bin or container does not exceed the predetermined required weight of the lifting mechanism, the load cell measures the weight of the storage container each time items are added to the storage container at the access station.

Preferably, the at least one access conveyor unit comprises multiple adjacent conveyor units arranged to transport a storage bin or container horizontally from the supply zone to the buffer zone via the access station. More preferably, each of the multiple conveyor units are arranged to accommodate a single container wherein at least one of the multiple conveyor units comprises the load cell. Optionally, a work surface is arranged above the at least one access conveyor unit, the work surface having an opening allowing access to the contents of a storage container on the at least one access conveyor unit. Typically, the storage bin or container is paused on a particular conveyor unit of the at least one access conveyor unit.

The at least one bin lift device in the buffer zone allows processed storage bins or containers to be queued, preferably vertically accumulated in the buffer zone before they are picked up by a load handling device and deposited into their respective home in the grid framework structure. For the purpose of the present invention, a processed storage bin or container represents a storage bin or container that has had one or more items picked from the storage bin or container when the access station functions as a pick station or loaded into the storage bin or container when operated as a decant/supply station. The at least one bin lift device prevents a bottleneck of storage bins in the access station, particularly at the work station and thereby, slowing the throughput of storage bins through the inventory handling station assembly. Preferably, at least one bin lift device comprises two parallel arms engageable with a bottom wall of a storage container, and a lifting mechanism arranged to move the two parallel arms in a vertical direction from a lowermost level below the conveyor system to an uppermost level above the conveyor system, i.e. upwardly towards the grid. This allows a load handling device operative on the grid, e.g. tracks, to subsequently retrieve the storage bin or container waiting at the uppermost level by grabbing the storage bin or container and lifting the storage bin or container into a container receiving space of the load handling device. This allows the bin lift device and thus, the inventory handling station assembly to be separate, e.g. disconnect, from the grid framework structure above. The bin lifting device allows one or more storage containers to be vertically accumulated in the buffer zone as they pass the access station. This increases the throughput of storage bins through the access station and therefore, improves the efficiency of the inventory handling station assembly of the present invention to process or fulfil orders when used as a pick station and/or to replenish stock when used as a supply station.

To enable one or more storage bins or containers to be vertically accumulated in the buffer zone, preferably, the two parallel arms are spaced apart by a distance greater than the width of the exit conveyor unit. This allows the two parallel arms to vertically descend past the exit conveyor unit in the buffer zone. Thus, once a storage bin is lifted above the conveyor system and has been picked up by a load handling device operative on the grid, the two parallel arms are instructed to descend past the exit conveyor unit in preparation to lift another storage bin or container waiting on the exit conveyor unit. The two parallel arms are able to descend past a storage bin or container waiting on the exit conveyor unit in the buffer zone so as to allow the lifting arms to position itself below and engage with a bottom wall of the storage bin.

Preferably, the at least one vertical chute comprises at least two vertical guides for guiding a storage container vertically along the at least one vertical chute, and each of the at least two vertical guides being receivable in a grid column of a grid framework structure. More preferably, each of the at least two vertical guides of a vertical chute comprises two perpendicular plates that extend along the length of the vertical chute. The at least two vertical guides of each of the at least one vertical chute help to guide a storage bin or container lowered by a load handling device onto the entry conveyor unit in the supply zone. Preferably, the at least two vertical guides are spaced apart so as to cooperate with a grid column, more specifically the upright columns of the grid framework structure is arranged to cooperate with the at least two vertical guides. This allows a load handling device operative on the grid to be able to lower a storage bin or container through a grid cell and down a vertical chute whereupon it descends on the entry conveyor unit in the supply zone. Preferably, the at least one vertical chute comprises four vertical guides to cooperate with the four corners of a storage container. More preferably, the inventory handling station assembly comprises sidewalls enclosing each of the at least one vertical chute.

In another aspect of the present invention, a fulfilment/restocking system is provided comprising:

A) a storage and retrieval system, the storage and retrieval system comprising a grid framework structure, said grid framework structure comprising:
  a) a plurality of upright columns and arranged to form a plurality of grid columns for one or more containers to be stacked between and be guided by the upright columns in a vertical direction,
  wherein the plurality of upright columns are interconnected at their top ends by a first set of grid members extending in a first direction and a second set of grid members extending in a second direction, the second set of grid members running transversely to the first set of grid members in a substantially horizontal plane to form a grid comprising a plurality of grid cell or grid spaces;
  the first and the second set of grid members supports a first and a second set of tracks respectively at an upper level of the grid framework structure for a load handling device to move one or more containers on the grid framework structure,
  b) one or more containers stored in one or more grid columns, each of the one or more containers comprising one or more items having a characteristic attribute,
  c) one or more load handling devices remotely operated to move the one or more containers stored in the grid framework structure, each of the one or more load handling devices comprises:
    i) a wheel assembly for guiding the load handling device on the grid;

ii) a container-receiving space located above the grid; and iii) a lifting device arranged to lift a single container from a stack into the container-receiving space, B) an inventory handling station assembly of the present invention, the one or more load handling devices being remotely operated to move the one or more containers stored in the grid framework structure to and/or from the inventory handling station assembly.

For the purpose of illustration of the present invention, the storage and retrieval system and the inventory handling station assembly are treated as separated components. However, the present invention is not limited to the inventory handling station assembly forming a separate part to the storage and retrieval system and the inventory handling station assembly can form part of the storage and retrieval system. In both cases, the fulfilment/restocking system comprises the storage and retrieval system and the inventory handling station assembly. The items can be any goods or grocery commodities. The goods or items can be bundled together in a package or bag for dispatch to a customer.

Preferably, the plurality of grid columns comprises a first set of grid columns and a second set of grid columns, wherein the first set of grid columns being arranged to store one or more containers in a stack, and wherein the inventory handling station assembly is arranged below the second set of grid columns such that the at least one vertical chute and the at least one bin lift device are arranged below at least one grid column so that, in use, a load handling device operative on the upper level of the grid framework structure can lower a container down the at least one vertical chute through at least one grid column and the at least one bin lift device is operative to lift a container to be picked up into the container receiving space of a load handling cell through the at least one grid column.

Not all of the grid columns are used for storing one or more containers between the upright columns but rather comprises a location where the load handling device can drop off and/or pick up storage bins or containers otherwise known as a port and the grid column in which the port is located may be referred to as a delivery column where one or more storage bins or containers are delivered into the supply zone. Similarly, the grid column where the port is located for the pick-up of storage bins or containers may be referred to as a retrieval column, i.e. where one or more storage bins are retrieved from the buffer zone. The first set of grid columns being arranged to form one or more vertical storage locations for one or more containers to be stacked between the upright columns and the second set of grid columns being arranged to cooperate with the at least one chute and the at least one bin lift device being arranged to receive and expel one or more storage containers or bins from the inventory handling station assembly. More specifically, the second set of grid columns comprise at least one delivery column and at least one retrieval column. The at least one delivery column is configured to cooperate with the at least one chute of the supply zone and the at least one bin lift device is arranged to cooperate with the at least one retrieval column.

Preferably, the inventory handling station assembly is arranged below the second set of grid columns such that each of the at least one vertical chute and the at least one bin lifting device are arranged below at least one grid column so that, in use, a load handling device operative on the upper level of the grid framework structure can lower a container down the at least one vertical chute through a first grid column and the at least one bin lift device is operative to lift a container to be picked up into the container receiving space of a load handling cell through a second grid column. Preferably, the one or more vertical chutes is arranged to be received within one or more grid columns of the second set of grid columns. More preferably, the second set of grid columns is supported by a mezzanine. For example, the grid from an adjacent grid framework structure is arranged to extend across the top of the mezzanine to create a service area for a pick station and/or a decant station there below. The mezzanine is supported by one or more vertical support beams, i.e. I-beams.

Preferably, the fulfilment/restocking system further comprises a bagging station, the bagging station comprising a table having a surface for supporting one or more bags and a user interface in communication with a bagging station control system. In an aspect of the present invention, the one or more items of a given order picked from the one or more storage bins or containers in the access station are transferred to one or more bags for delivery to a customer. At least one user interface in communication with the bagging station control system provides an input device to acknowledge the fulfilment of an item of an order being picked from one or more storage bins or containers in the access station, i.e. to acknowledge that an item of an order has been picked and loaded into a bag. This is repeated until all of the items of the order has been fulfilled. Thus, each time one or more items are picked and loaded into the bags, the operator acknowledges the fulfilment of the one or more items of the order by an input device, preferably the user interface in communication with the bagging station control system. The bagging station control system can be separate to the central control system concerning information on where to pick up and deliver a container or tote in the grid framework structure and/or the control system controlling the amount of stock or inventory stored in the storage and retrieval system, or some or all of these functions can be combined in the same control system.

Preferably, the table is divided into one or more spaces or compartments by one or more partitions, each of the one or more spaces or compartments comprising the user interface. Multiple orders of one or more items can be separated on the table by the one or more partitions. The partitions are used to separate one or more bags on the table surface. The separations could be based on different customer orders or on an attribute associated with the same order, e.g. frozen, chilled or ambient items. Optionally, each of the one or more bags are standalone bags. The acknowledgment that an item has been picked can be used to update the stock control system comprising the inventory database of the remaining stock or inventory in the storage system.

The one or more bags comprising the fulfilled order of items can optionally be dispatched over a counter for pick up by a customer or courier. Optionally, the one or more bags can be transferred to a plurality electronically controllable lockers, each of the plurality of electronically controllable lockers comprising a compartment that is sized to accommodate the one or more bags. As is commonly known in the art, the electronically controllable lockers can work in conjunction with a range of e-commerce platforms where items purchased online are transported from a fulfilment centre or distribution centre to a collection point accessible by a customer, e.g. click and collect model. The fulfilled orders are stored in electronically controllable lockers that are accessible by a purchasing customer or courier as taught in the GB patent application, GB2004400.4 (Ocado Innovation Limited), the contents of which are incorporated herein by reference. Other examples of the use of electronically controllable lockers are taught in GB240712B (Bearbox Limited), EP 1366442B1 and EP2375386A2 (ByBox Holdings Limited).

The load handling device preferably comprises a control unit which receives control signals from a radio communications unit of a control system or a central control system concerning information on where to pick up and deliver a container or tote in the grid framework structure. The control system can be separate to the control system controlling the amount of stock or inventory stored in the storage and retrieval system discussed above or be the same control system.

When used as a pick station, the control system is instructed to locate and retrieve one or more storage containers storing one or more items of the order and deliver them to the supply zone of the inventory handling station assembly of the present invention whereupon they are transported along the conveyor system to a pick station where the items are picked from the storage containers or bins into delivery containers. The storage bins or containers with the remaining items are then returned to their allocated homes in the grid framework structure. When the access station is used as a decant station or supply station to replenish stock in the storage bins or containers, the load handling device is instructed to retrieve one or more storage containers from their allocated grid columns or storage columns. These could be empty storage containers or storage containers storing one or more items bearing a particular SKU (stock keeping unit). An item such as grocery items has an attribute which is characteristic of the item such as manufacturer, brand, style, colour and/or size. Different items can be identified from each other by a characteristic attribute. An example of an attribute used by retailer to identify different stock or inventory is a stock control unit or SKU.

The retrieved one or more storage containers are moved to the decant or supply station in the inventory handling station assembly where items of a particular SKU are loaded into one or more storage containers or bins. The loaded storage bins or containers are subsequently moved by the conveyor system to the buffer zone where they are vertically accumulated until a load handling device or bot becomes free to return the storage bin or container to a suitable home in the grid framework structure, i.e. stored in a grid column or storage column.

Traditionally, when fulfilling an order of one or more items, the control system comprising one or more processors and memory storing instructions when executed by the one or more processors is configured to instruct one or more load handling devices to retrieve one or more storage bins or containers for each item of the order. Thus, when fulfilling an order for multiple different items, the control system is configured to retrieve multiple storage bins or containers for each of the multiple different items identified in the order. Whilst this is suitable where there are multiple load handling devices operational on the grid framework structure that are able to retrieve the multiple storage bins or containers to fulfil a single order of a plurality of items, the situation is different where multiple orders containing a plurality of items are needed to be fulfilled within a tight timeslot and/or there are limited number of load handling devices available to retrieve the necessary storage bins or containers to fulfil the multiple orders. For example, there is a trend towards immediacy dispatch of orders within a tight timeslot, e.g. a couple of hours from receipt of the order, than in traditional on-line retail where orders are typically fulfilled over a period of days. Convenience retail is particularly prevalent where the order is for staple grocery items such as milk, cheese, beverages etc.

In another aspect of the fulfilment/restocking system of the present invention, the storage and retrieval system further comprises:

a control system comprising one or more processors and memory storing instructions that when executed by the one or more processors in response to receiving a plurality of orders, whereby each of the plurality of orders comprising one or more items, causes the one or more processors:
  i) to group or collate the plurality of orders based on at least one attribute of the one or more items being common between the plurality of orders;
  ii) to generate signals to instruct the load handling device to retrieve a first container storing the one or more items common to the plurality of orders;
  iii) to generate signals to instruct the load handling device to lower the first container down the at least one vertical chute via the at least one grid column,
  iv) to instruct the conveyor system to transport the first container to the access station such that the one or more items common to the plurality of orders can be transferred to a plurality of delivery containers associated with the plurality of orders,
  v) to instruct the conveyor system to transport the first container to the buffer zone.

For the purpose of the present invention, an attribute of an item corresponds to a particular characteristic of the item such as manufacturer, brand, style, colour and size and is usually identified by a characteristic stock control unit (SKU). For example, cheese of a particular brand will be identified by a characteristic SKU. In order to reduce the number of trips one or more load handling device has to undergo to retrieve multiple storage bins or containers to fulfil a plurality of orders, the control system comprising one or more processors and memory storing instructions that when executed by the one or more processors in response to receiving a plurality of orders causes the one or more processors to group or collate the plurality of orders based on at least one attribute of the one or more items being common between the plurality of orders. In the case where the one or items are grocery items, the one or more grocery items being common or shared amongst a plurality of orders. Here, multiple orders can be collated or grouped together based on each of the multiple orders comprising an order of a particular grocery item, e.g. cheese of a particular attribute, being shared amongst the plurality of orders. The control system instructs a load handling device to retrieve a single storage bin or container where the contents of the storage bin or container comprises the grocery item, e.g. cheese of the particular attribute, so that the contents of the storage bin or container can be shared amongst the plurality of orders.

By grouping or collating a plurality of orders based on at least one attribute of the one or more items being common between the plurality of orders, items of a single storage bin or container can be shared between multiple orders. This removes the need to repeatedly retrieve the same storage bin or container from the grid framework structure for multiple different orders. By collating or grouping the plurality of orders based on at least one attribute of the one or more items being common between the plurality of orders, the control system is able to generate signals to instruct the load handling device to retrieve a first container storing the one or more items common to the plurality of orders, to generate signals to instruct the load handling device to lower the first container down the at least one vertical chute via the at least one grid column and to instruct the conveyor system to transport the first container to the access station such that the one or more items common to the plurality of orders can be shared amongst a plurality of delivery containers associated with the plurality of orders. For example, the delivery container can be a bag. By grouping or collating the plurality of orders based on at least one attribute of the one or more items being common between the plurality of orders, items from a single storage bin or container can be shared amongst multiple delivery containers, e.g. picked contemporaneously, thus, saving processing time to fulfil multiple orders. For the purpose of illustration of the present invention, the grid column where the at least one vertical chute is located is termed a delivery column and the grid column where the at least bin lift device is located is termed a retrieval column.

Preferably, wherein the control system is further configured to cause the one or more processors to execute instructions:
  v) to generate signals to instruct the load handling device to retrieve a second container storing the one or more items common to the plurality of orders;
  vi) to generate signals to instruct the load handling device to lower the second container down the at least one vertical chute via the at least one grid column,
  vii) to instruct the conveyor system to transport the second container to the access station such that the one or more items common to the plurality of orders can be transferred to the plurality of delivery containers associated with the plurality of orders;
  viii) to instruct the conveyor system to transport the second container to the buffer zone Preferably, the control system is further configured to cause the one or more processors to execute instructions to generate signals to instruct the one or more load handling devices to retrieve the first container and the second container from the buffer zone via the at least one retrieval column.

To further increase the efficiency of the fulfilment of multiple orders, preferably the first container comprises one or more items of a first attribute and one or more items of a second attribute, and wherein the one or more items of the first attribute and/or the one or more items of the second attribute are common amongst the plurality of orders. In this case, the control system is able to collate or group multiple or a plurality of orders of multiple different items based on the multiple different items or at least one item of each of the plurality of orders being common or shared between the plurality of orders. By storing multiple different items in a single storage bin or container, where each of the different items has a characteristic attribute, the control system is able to locate and retrieve a single storage bin or container where the contents of the storage bin or container can be shared amongst multiple orders. This increases the likelihood that the contents of the storage bin or container can be shared amongst a plurality of orders. Therefore, fewer load handling devices are needed to retrieve storage bins or containers to fulfil an order of one or more items.

Preferably, the storage and retrieval system of the fulfilment/restocking system further comprises an order database comprising data associated with a plurality of orders of one or more items,
  wherein the control system is configured to access the order database to group or collate the plurality of orders based on at least one attribute of the one or more items being common between the plurality of orders.

Preferably, the storage and retrieval system of the fulfilment/restocking system further comprises a stock database comprising data of at least one attribute of one or more items.

To increase the efficiency of processing storage bins or containers through the inventory handling station assembly, the at least one bin lift device comprises a first bin lift device and a second bin lift device, the control system being configured to instruct the conveyor system to transport a container to the first bin lift device or the second bin lift device depending on the occupancy of the first bin lift device and the second bin lift device. More preferably, the occupancy of the first bin lift device and the second bin lift device is determined by one or more sensors in the first bin lift device and the second bin lift device. For example, the one or more sensors can be photoelectric sensors (thru-beam sensors or reflective sensors or proximity sensors) based on transmitting and receiving light. In response to a signal from the one or more sensors in the bin lift device, the control system can determine the occupancy of the bin lift device and if required, re-direct the storage bin or container to a second bin lift device to provide some slack to the buffer zone. This could be through a change of direction of the storage bin or container at the buffer zone.

The present invention provides a method of fulfilling a plurality of orders by a fulfilment/restocking system of the present invention, each of the plurality of orders comprising one or more items, the method comprising the steps of:
  i) grouping or collating the plurality of orders based on the plurality of orders comprising one or more items having at least of attribute common to each of the plurality of orders,
  ii) identifying the first container comprising the one or more items having at least of attribute common to each of the plurality of orders
  iii) instructing the one or more load handling devices to retrieve the first container storing the one or more items from the grid framework structure,
  iv) lowering the first container into the supply zone via the at least one vertical chute,
  v) transporting the first container to the access station,
  vi) transferring the one or more items from the first container to the plurality of delivery containers associated with the plurality of orders;
  vii) transporting the first container to the buffer zone,
  viii) lifting the first container towards the grid,
  ix) instructing the one or more loading handling devices operative on the grid to retrieve the first container from the buffer zone and return the first container to the grid framework structure.

When an order is received for one or more items or when otherwise desired to pick items required to fulfil an order wholly or in part, the control system associated with the inventory handling station assembly of the present invention can request retrieval to the inventory handling station assembly of any storage bin or container containing the desired items to be picked at the access station that functions as a pick station. Such storage bins or containers can be retrieved from one or more stacks in corresponding portions of the grid framework structure and delivered to the inventory handling station assembly by being hoisted by an overhead load handling device operative on the grid and delivered to a port where they are lowered down a delivery column of the grid framework structure. The at least one chute of the supply zone is configured to cooperate with the delivery column to receive the storage bin. Similarly, the at least one bin lift device is configured to cooperate with the retrieval column to raise the storage bin or container to a level to be picked up by a load handling device and therefore, exit the buffer zone.

A plurality of orders can comprise a first order of one or more items and a second order of one or more items. The first storage bin or container comprises one or more items having an attribute that is common or shared between the first order and the second order. The method further comprise the steps of:
i) identifying the second container comprising the one or more items having at least of attribute common to each of the plurality of orders,
ii) instructing the one or more load handling devices to retrieve the second container storing the one or more items from the grid framework structure,
iii) lowering the second container into the supply zone via the at least one vertical chute,
iv) transporting the second container to the access station,
v) transferring the one or more items from the second container to the plurality of delivery containers associated with the plurality of orders;
vi) transporting the second container to the buffer zone,
vii) lifting the second containers towards the grid,
viii) instructing the one or more loading handling devices operative on the grid to retrieve the second container from the buffer zone and return the second container to the grid framework structure.

Preferably, the delivery container or bin is a bag. The method further comprises the step of transferring one or more items from one or more containers to one or more bags. Optionally, the one or more bags comprising a fulfilled order of one or more items is transported to one or more electronically controllable lockers where they are stored in one or more compartments for pick up by a customer or a courier.

Another aspect of the present invention provides a method of stocking or restocking one or more items by a fulfilment/restocking system according to the present invention, comprising the steps of:—
i) transferring stock of one or more items to one or more containers in the access station,
ii) moving the one or more containers containing the stock of one or more items to the buffer zone,
iii) lifting the one or more containers containing the stock of one or more items towards the grid in the buffer zone,
iv) instructing the one or more loading handling devices to retrieve the one or more containers containing the stock of one or more items from the buffer zone and transport the one or more containers to the grid framework structure.

In this aspect of the present invention, the access station of the inventory handling station assembly of the present invention doubles up as a restocking station. Palletized items or other batches of items arrive at the restocking station. For example, pallets may be removed from a truck and wheeled to the inventory handling station assembly which doubles up as a stocking or restocking station. Upon removal or opening of any packaging, one or more items are transferred into one or more storage bins or containers in the access station. Depending on the type of item and as discussed above, each of the one or more items will be classified with a particular SKU or stock keeping unit. As is commonly known in the art, a SKU or stock keeping unit is used by retailers to identify and track its inventory or stock. A SKU is a unique code consisting of letters and numbers that identify characteristics about each item, such as manufacturer, brand, style, colour and size. This can be recorded in a barcode. Items of a particular type are grouped together depending on their SKU. In one aspect of the present invention, a load handling device operative on the grid framework structure is instructed to retrieve a storage bin from an upright column in the grid framework structure. This could be an empty storage bin or container or a partially empty storage bin or container storing the same type of item or item bearing the same SKU as the palletised items. The method further comprises the step of instructing one or more load handling devices to retrieve one or more containers from the grid framework structure and lower the one or more containers to the supply zone via the at least one vertical chute and subsequently transport the one or more containers from the supply zone to the access station which doubles up as a stock station. In another aspect of the present invention, fresh storage bins or containers can be introduced into the grid framework structure via the access station. In both cases, one or more items are loaded into the storage bins or containers and fed into the grid framework structure via the buffer zone. Preferably, the method further comprises the steps of weighing one or more containers in the access station. This is so that the weight of the storage bin or container does not exceed a predetermined weight necessary for safely lifting the storage bin or container in the buffer zone and/or the lifting device of the load handling device. Typically, the lifting device of the load handling device which comprises one or more motors is rated to lift a predetermined weight beyond which the lifting device will struggle to lift the container. The weight of each of the storage bins or containers in the access station is measured by a weighing cell, e.g. load cell. Optionally, the conveyor system is instructed to prevent transporting a storage bin or container to the buffer zone if the weight of the storage bin or container exceeds a predetermined weight.

DETAILED DESCRIPTION

Further features and aspects of the present invention will be apparent from the following detailed description of an illustrative embodiment made with reference to the drawings, in which:

FIG. 4 is a schematic perspective view of the load handling device showing the lifting device gripping a container from above.

FIGS. 5(a) and 5(b) are schematic perspective cut away views of the load handling device of FIG. 4 showing (a) the container receiving space of the load handling device and (b) a container accommodating the container receiving space of the load handling device.

FIG. 6 is a perspective front view of an inventory handling station assembly according to an embodiment of the present invention, FIG. 7 is a perspective view showing the framework of the inventory handling station assembly shown in FIG. 6.

Figure 1:
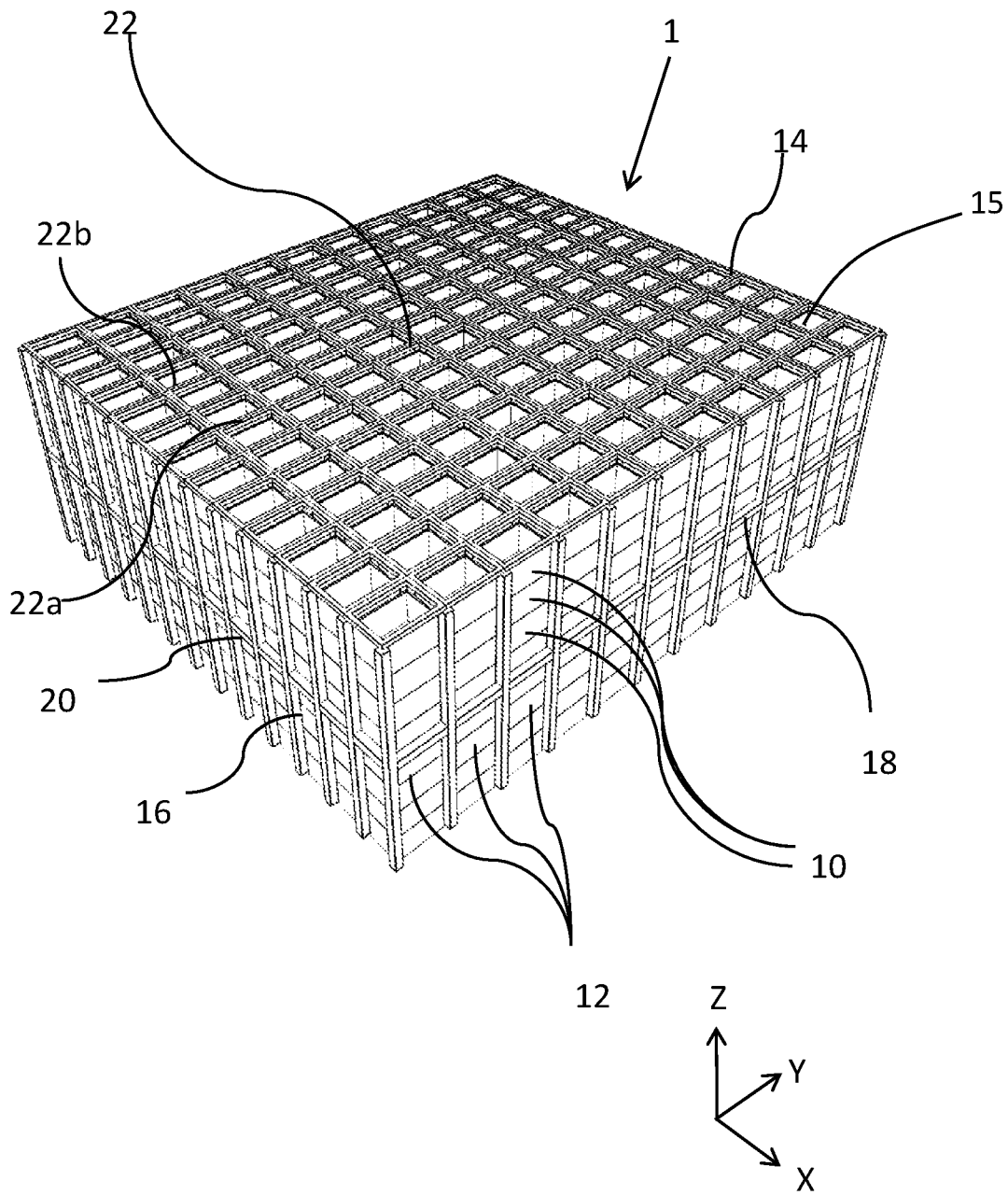
FIG. 1 is a schematic diagram of a grid framework structure according to a known system.
Figure 2:
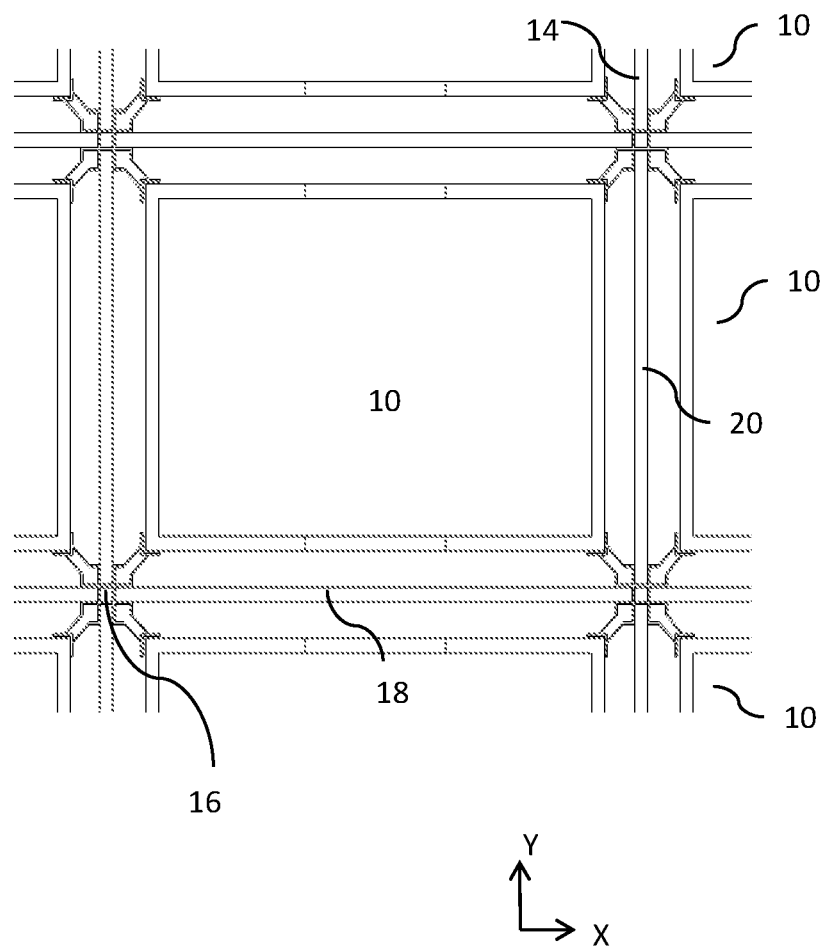
FIG. 2 is a schematic diagram of a top down view showing a stack of bins arranged within the framework structure of FIG. 1.
Figure 3:
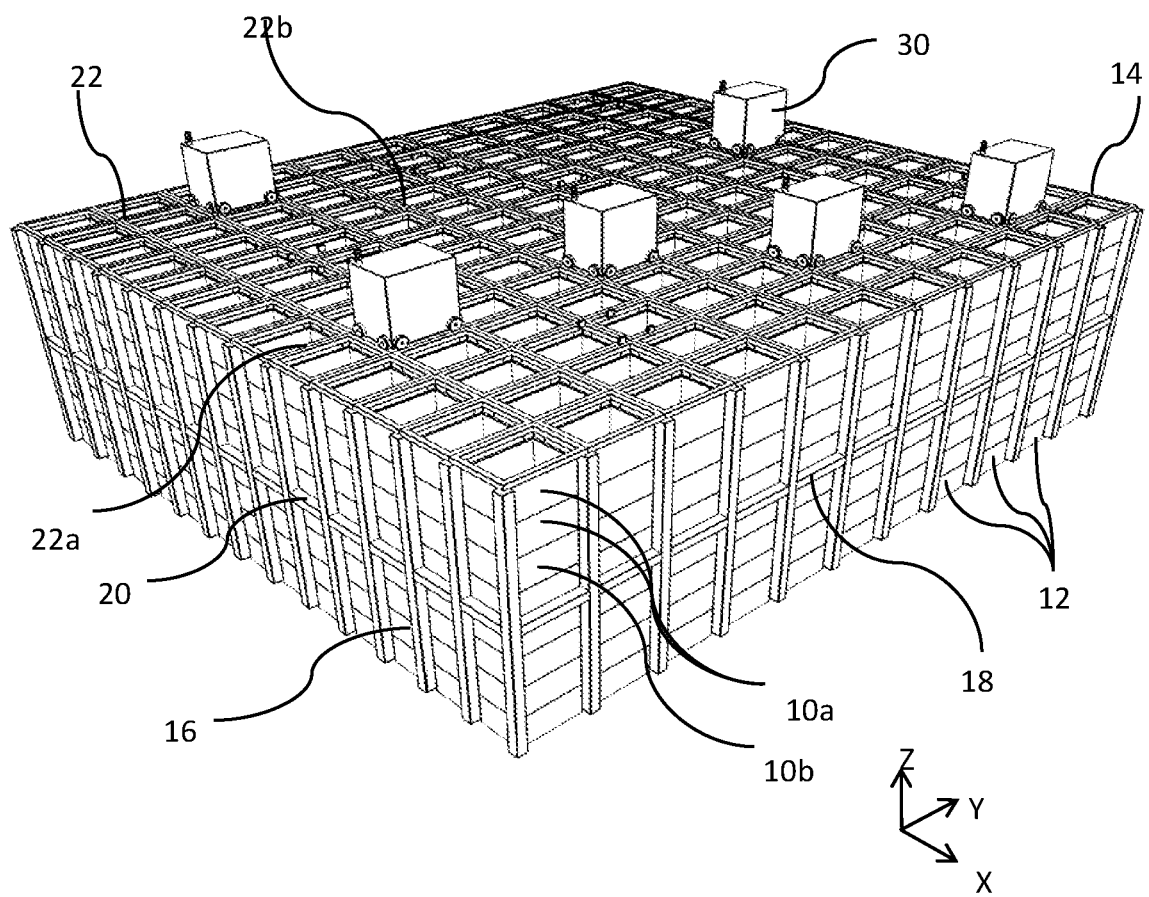
FIG. 3 is a schematic diagram of a system of a known load handling device operating on the grid framework structure.
Figure 8:
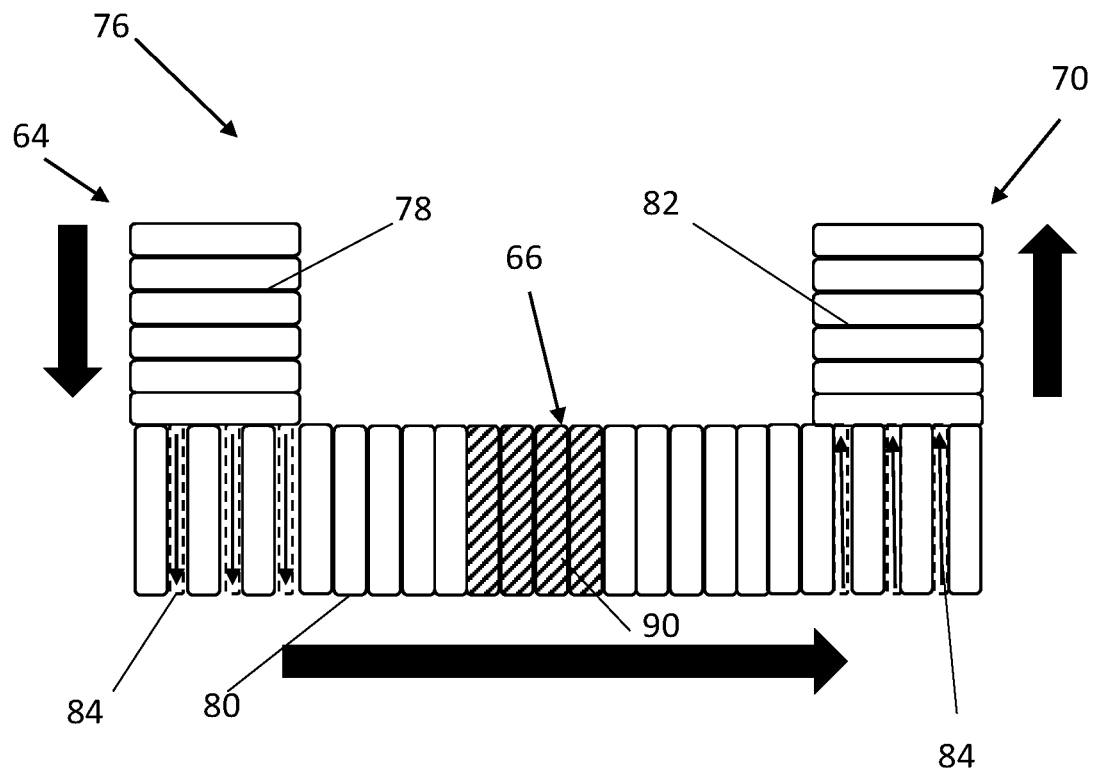

FIG. 8 is a top view of the conveyor system according to an embodiment of the present invention.

Figure 9:
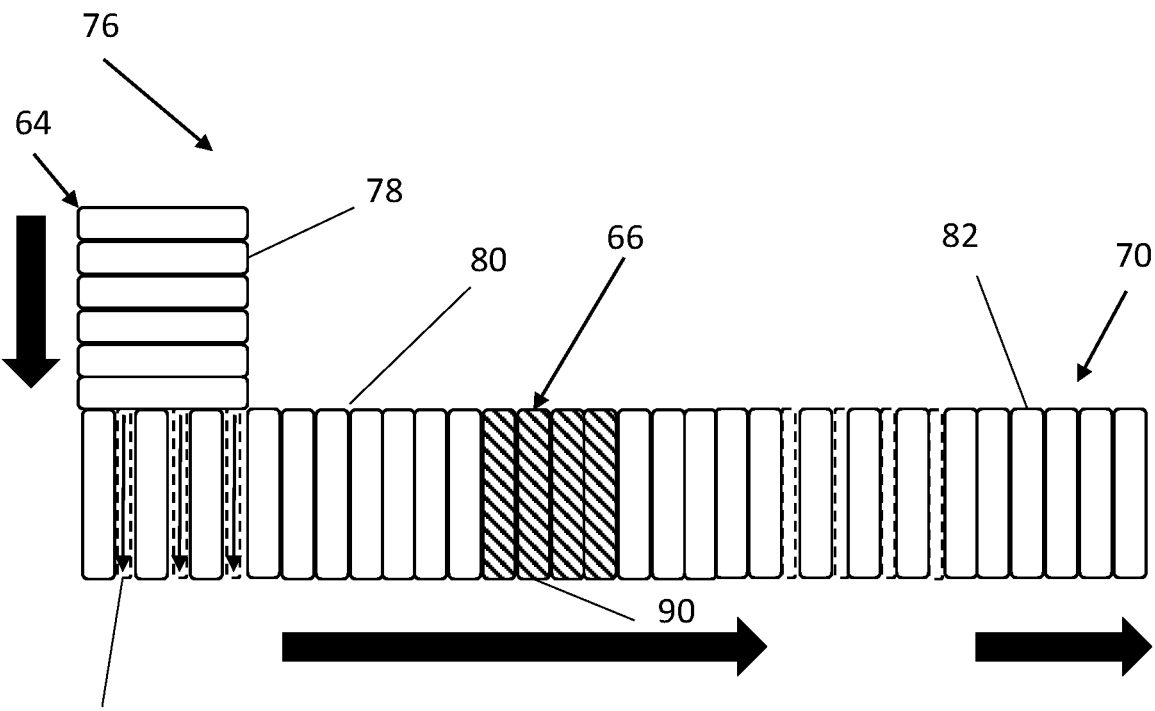

FIG. 9 is a top view of the conveyor system according to another embodiment of the present invention.

Figure 10:
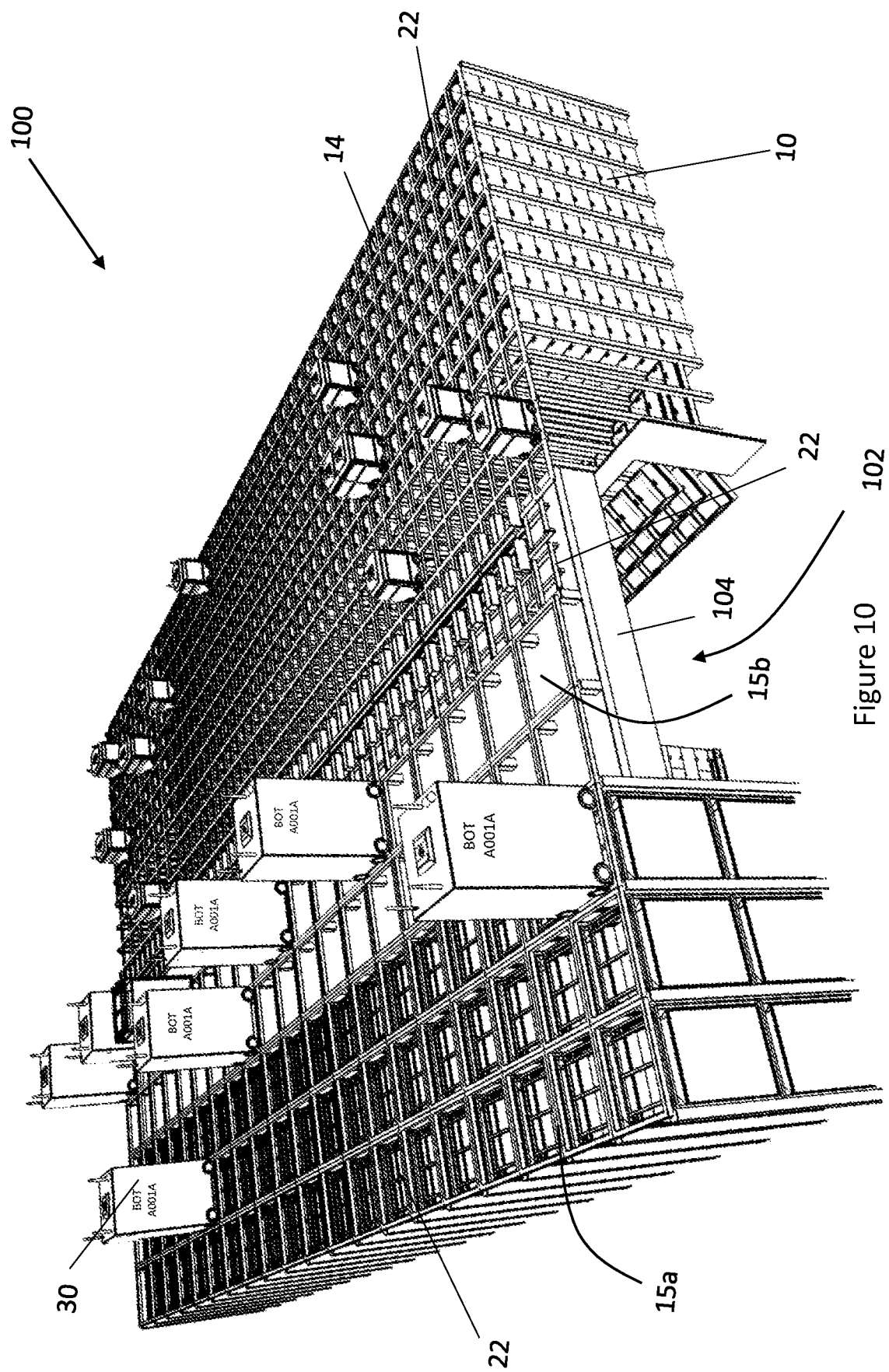

FIG. 10 is a top plan view of a fulfilment centre incorporating a mezzanine to accommodate the inventory handling station assembly according to the embodiment of the present invention.

Figure 11:
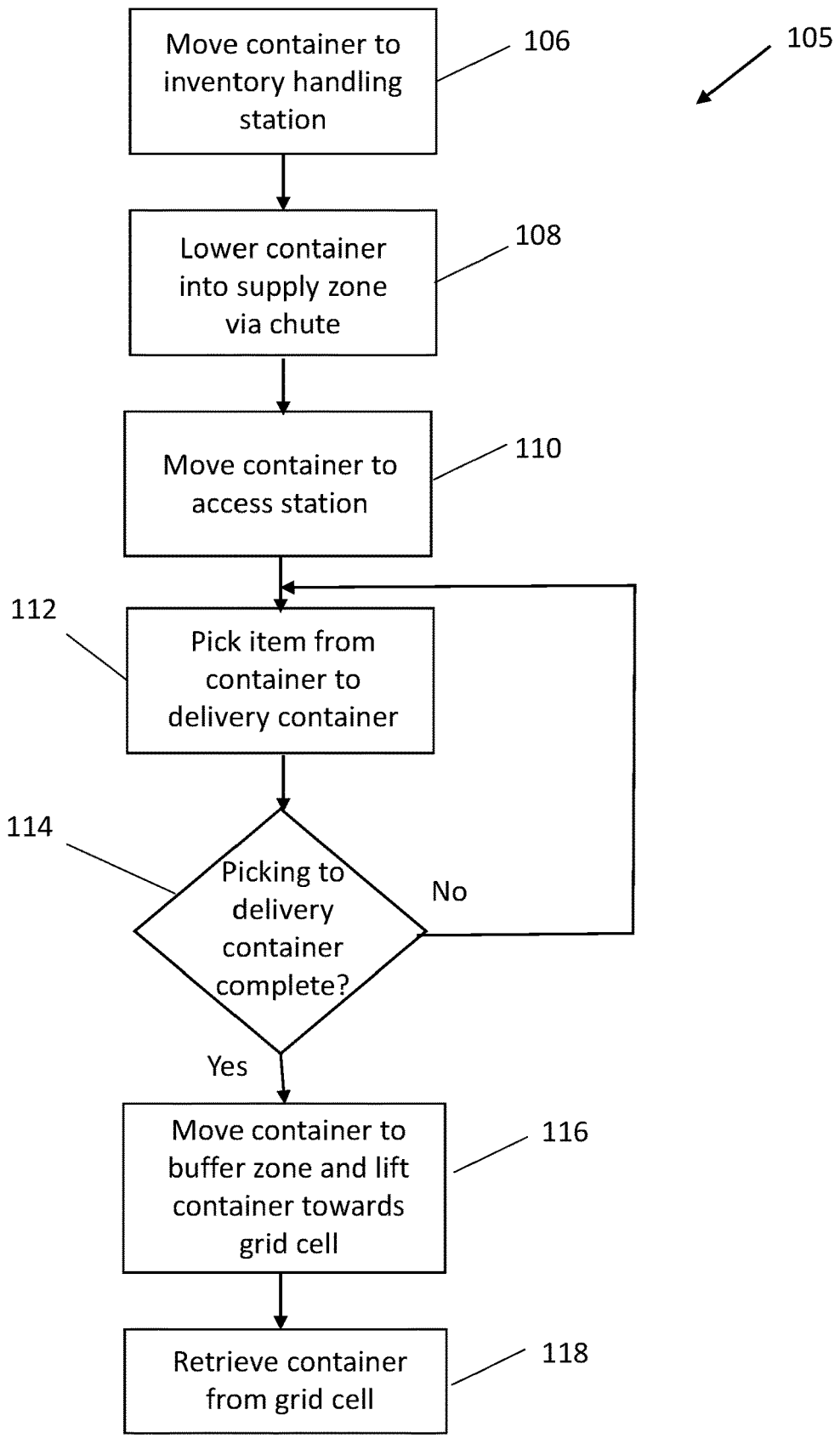

FIG. 11 is a flow chart depicting the operational steps of a pick station according to an embodiment of the present invention.

Figure 12:
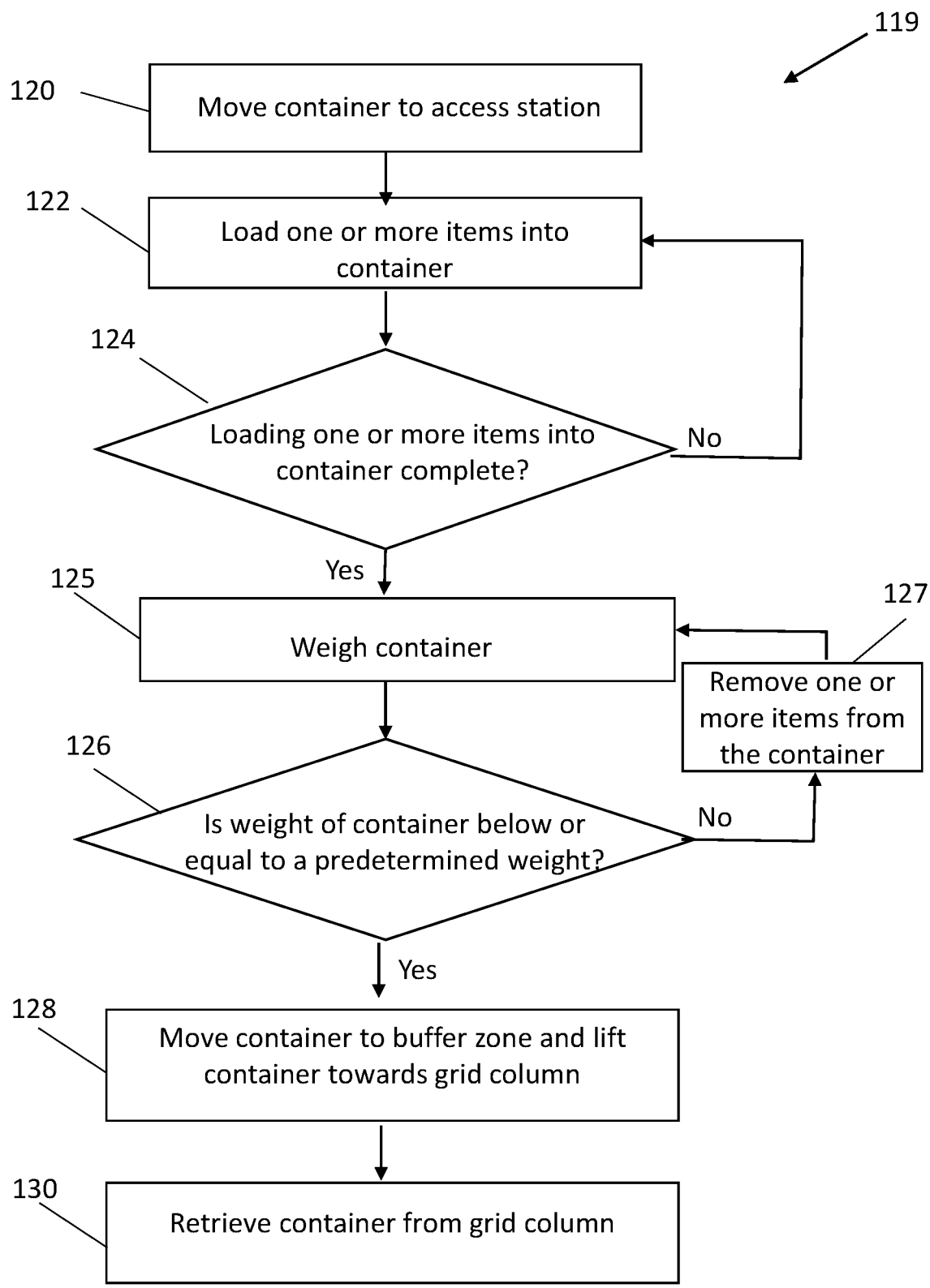

FIG. 12 is a flow chart depicting the operational steps of a restock station according to an embodiment of the present invention.

Figure 13:
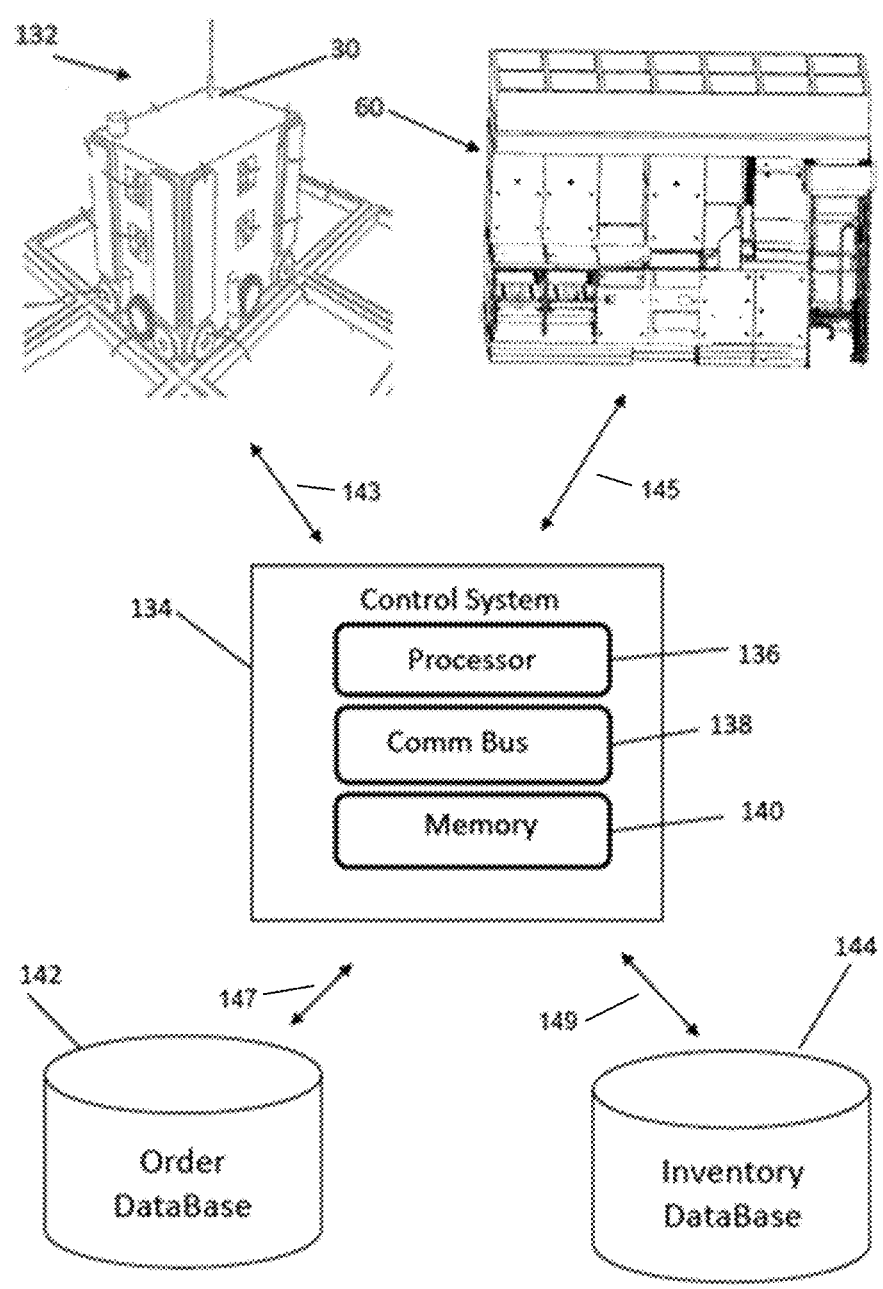

FIG. 13 is a block diagram showing the components of the fulfilment system according to an embodiment of the present invention.

FIG. 14a is a perspective view of the inventory handling station assembly incorporating a bagging station according to an embodiment of the present invention.

Figure 14B:
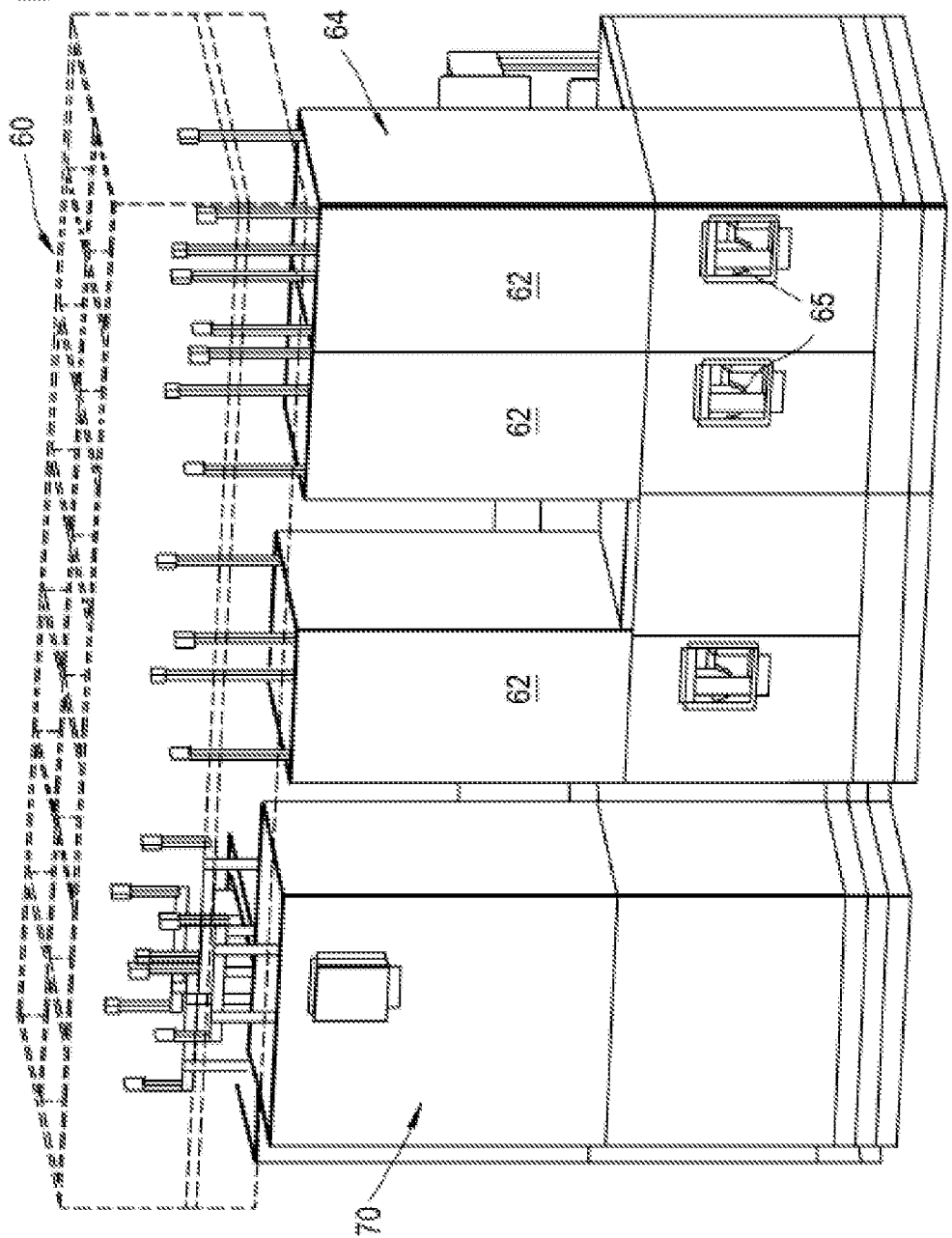

FIG. 14b is a perspective view of the rear of the inventory handling station assembly shown in either FIG. 6 or FIG. 14a.

Figure 15:
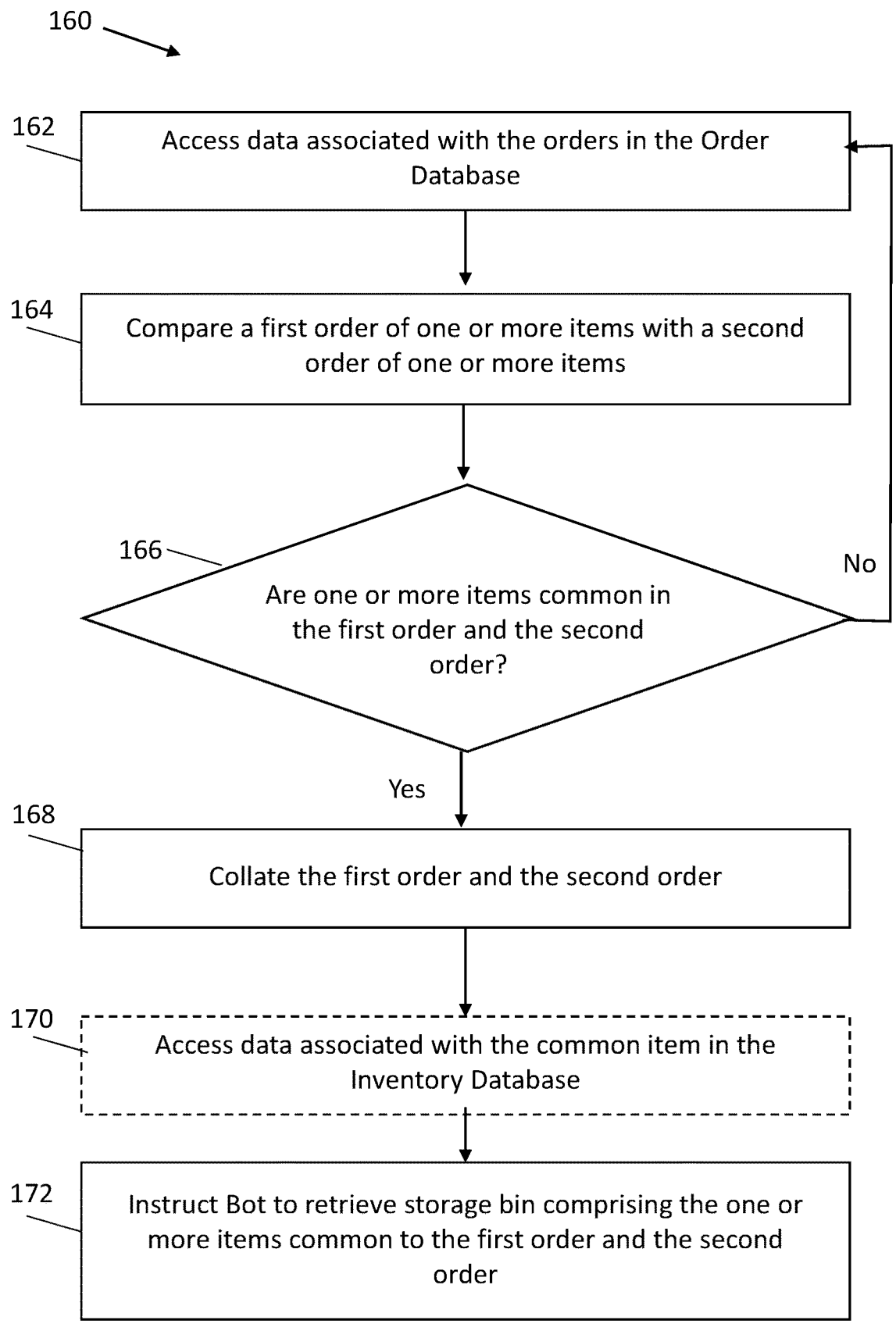

FIG. 15 is a flow chart depicting the computational steps in collating or grouping a plurality of orders according to an embodiment of the present invention.

Figure 16:
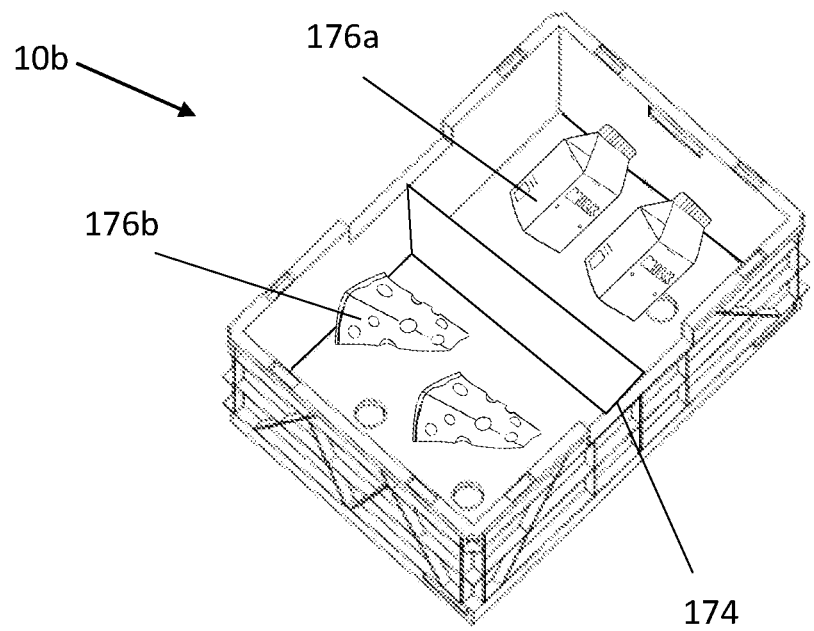

FIG. 16 is a perspective view of a storage bin or container according to one embodiment of the present invention.

Figure 17:
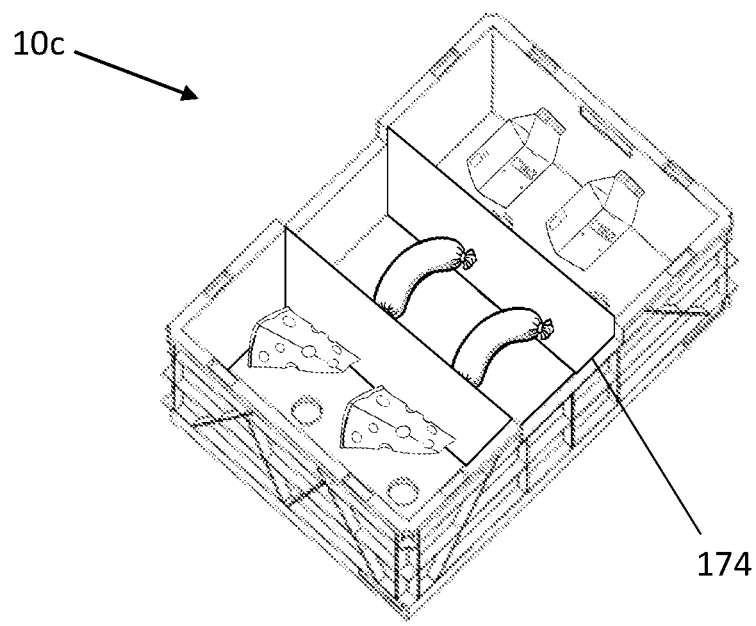

FIG. 17 is a perspective view of a storage bin or container according to another embodiment of the present invention.

It is against the known features of the storage system such as the grid framework structure and the load handling device described above with reference to FIGS. 1 to 5, the present invention has been devised. In a typical fulfilment centre, a large variety of items, such as grocery items are stored in storage bins or containers and the storage bins or containers are stored in one or more stacks in the grid framework structure, more specifically within grid columns. The grid columns are formed by a plurality of upright columns arranged as vertical storage locations.

Individual containers may be stacked in vertical layers, and their locations in the grid framework structure or "hive" may be indicated using co-ordinates in three dimensions to represent the load handling device or a container's position and a container depth (e.g. container at (X, Y, Z), depth W). Equally, locations in the grid framework structure may be indicated in two dimensions to represent the load handling device or a container's position and a container depth (e.g. container depth (e.g. container at (X, Y), depth Z). For example, Z=1 identifies the uppermost layer of the grid framework structure, i.e. the layer immediately below the rail system, Z=2 is the second layer below the rail system and so on to the lowermost, bottom layer of the grid framework structure. A majority of the grid columns in the grid framework structure are storage columns.

A order fulfilment system comprises a bin or container filling station, storage and retrieval system, a plurality of order picking stations, an order container handling and sortation system and dispatch facilities. Details of an order fulfilment system are described in PCT/IB2014/062165 (Ocado Innovation Limited) details of which are incorporated herein by reference. In the order fulfilment system such as the one described in PCT/IB2014/062165 (Ocado Innovation Limited), individual containers are stored within the storage and retrieval system and can contain one or more items, which may be identical. The storage and retrieval system comprises the grid framework structure where storage bins or containers are stored in grid columns.

To pick an order comprising different items, it is often necessary to retrieve items from multiple source containers. Such containers can be retrieved from the storage and retrieval system and brought to a desired order picking system. Specific containers required for fulfilment of orders are accessed by a robotic load handling device operative on the grid framework structure. The load handling device preferably comprises a control unit which receives control signals from a radio communications unit of a control system or a central control system concerning information on where to pick up and deliver a storage bin or container in the grid framework structure. The control system controls the operation of one or more load handling devices operative on the grid framework structure and comprises one or more processors, a memory (e.g. read only memory and random access memory) and a communication bus. The memory can be any storage device commonly known in the art and include but are not limited to a RAM, computer readable medium, magnetic storage medium, optical storage medium or other electronic storage medium which can be used to store data and accessed by the one or more processors.

At least one grid column is not used for storing containers and typically, comprises a location where a load handling device can drop off and/or pick up storage containers or bins to and from a pick or supply station outside of the grid framework structure. Within the art, such a location is normally referred to as a "port" and corresponds to the grid cell where a storage bin or container are dropped off or picked up. Depending on whether the port is located for drop off or pick up of a storage container, the grid column where the port is located may be referred to as a "delivery column" located at a drop off port and a "retrieval column" located at a pick up port.

As is commonly known in the art, items in the inventory are identified and tracked by a unique code called a SKU (stock keeping unit) that identifies a characteristic attribute about each item in the inventory, such as manufacturer, brand, style, colour, and size and help to distinguish different types of items in the inventory or stock, e.g. cheese of a particular brand. When a retailer takes inventory of its stock, it counts the quantity it has of each SKU. Palletized or other batches of items arrive at a container filling or restocking station. For example, pallet(s) of items may be removed from a truck or other means of conveyance at an order processing/fulfilling centre, and be wheeled into one or more storage bin or container filling stations. Typically, the filling station comprises trolleys, conveyors, trolleys etc. for holding a plurality of storage bins or containers. The filling station can receive either empty or partially filled storage containers. As desired stocking of storage containers or bins is complete, the storage containers may be transferred to storage in the storage and retrieval system, as for example, by conveyor, and stored therein until needed for fulfilment of an order. For example, a storage bin or container may be brought to a drop off port by an overhead load handling device operative on the grid framework structure and lowered to a picking station where one or more of items of the order can be picked into a destination or delivery container.

A storage control and communication system is used to monitor inventory, to keep track of the location of respective storage bins or containers within the grid framework structure and the contents of each of the storage bins or containers. The storage control and communication system may also form part of or may be in communication with the control system or central control system for controlling a load handling devices instructed to pick a desired storage bin or container from within the grid framework structure and deliver it to a desired location or drop off port on the grid framework structure at a desired time without colliding with other load handling devices operative on the grid framework structure.

In an embodiment of the present invention, the picking station doubles up as a restocking station. For the purpose of the present invention, the picking/restocking station may be referred to as an inventory handling station assembly which has an access station that can function both as a picking station and/or a restocking station. The inventory handling station assembly cooperates with the storage and retrieval system to provide a fulfilment system for the fulfilment of one or more orders. In the embodiment shown in FIG. 6, the inventory handling station assembly 60 comprises one or more chutes 62 forming a supply zone 64, an access station 66 and one or more bin lift devices 68 forming a buffer zone 70. By reference to its name, the one or more chutes 62 allows a load handling device operative on the grid framework structure 14b to lower a storage bin or container without any assistance from the one or more chutes 62. This could be under the action of gravity where the storage bin or container is allowed to descend down the chute 62 under the weight of the storage bin or container and/or being lowered by the lifting or winch mechanism of the load handling device.

One or more items are picked from or loaded into one or more storage bins or containers in the access station 66 depending on whether the access station 66 functions as a pick station or a restocking station. The one or more chutes 62 and the one or more bin lift devices 68 are arranged to cooperate with the grid framework structure 14b above. The grid framework structure 14b comprises a plurality of upright columns lying in one or more vertical planes and arranged to form a plurality of vertical locations or vertical grid columns 15 for containers to be guided by the plurality of upright columns in a vertical direction. The plurality of vertical grid columns extends across the one or more chutes 62 and the one or more bin lift devices 68 of the inventory handling station assembly 60 (see FIG. 6). The plurality of upright columns are interconnected at their top ends by a first set of grid members extending in a first direction and a second set of grid members extending in a second direction, the second set of grid members running transversely to the first set of grid members in a substantially horizontal plane to form a grid comprising a plurality of grid cell or grid spaces. The plurality of grid cells are sized to allow a storage bin to be enter or exit a grid cell. The plurality of grid cells comprises a drop off port and a pick-up port that is arranged to cooperate with the one or more chutes 62 and the one or more bin lift devices 68 respectively. More specifically, the grid column to which the drop off port (delivery column 15b) and the pick port (retrieval column 15c) are located are arranged to respectively cooperate with the one or more chutes 62 and the one or more bin lift devices 68 of the inventory handling station assembly 60.

The inventory handling station assembly 60 of the present invention is arranged as a standalone station that can be easily retrofitted to an existing grid framework structure and therefore, is able to cooperate with a grid running overhead. For example, the at least one chute and the at least one bin lift device can be aligned with one or more grid columns so that a storage container or bin can readily pass through the grid column into the at least one chute. Equally, a storage bin or container can be lifted from the at least bin lift device and pass through the grid column. The inventory handling station assembly 60 can be of a modular construction wherein the supply zone 64, the access station 66 and the buffer zone 70 can be formed as modules that are assembled together. As a result, the inventory handling station assembly 60 has no reliance to be connected to the grid framework structure but can be formed as a separate part of the grid framework structure. The versatility of the inventory handling handing station to be retrofitted to an existing grid framework structure allows the inventory handling station assembly to be assembled in various centres from large distribution centres handling thousands of items to small convenience stores catering for a smaller proportion of orders. For example, the inventory handling station assembly can form a part of a back office set up where orders are fulfilled in the back office before being dispatched to a customer or courier or over the counter.

Referring back to FIGS. 6 and 7, the inventory handling station assembly 60 comprises a standalone framework that divides the inventory handling station assembly into the supply zone 64, the buffer zone 70 and the access station 66. The one or more chutes 62 of the supply zone 64 comprises at least two vertical guides 72 that are receivable in a grid column 15b and are arranged to guide a storage bin or container down the grid column 15b into the supply zone 64 via the drop-off port. In terms of definition, the grid column in which the drop off port in the grid is located is termed a delivery column 15b. Likewise, the grid column in which the pick-up port in the grid is located is termed a retrieval column 15c. In the particular embodiment of the present invention, each of the one or more chutes 62 comprises four guides 72 that are receivable in a grid column 15b of the grid framework structure 14b. Each of the guides 72 comprises two perpendicular plates (two container guiding plates perpendicular to each other) that extend longitudinally along the length of the chute. As shown in FIG. 7, one end of each of the guides are arranged to extend into a grid column or delivery column 15b and butts up against the four upright columns that make up the grid column. Thus, a storage bin or container being lowered down a drop off port is guided down a chute 62 of the supply zone 64 by the guides 72 via the delivery column 15b (to which the drop off port is located).

Sidewalls or panels 74 are mounted externally to the at least two vertical guides 72 to enclose the vertical chutes 62. The sidewalls or panelling 74 provides shielding to an operator from one or more storage bins or containers descending down the chute 62 in the supply zone 64. In the particular embodiment shown in FIG. 7, a first portion of the guides are covered by sidewalls or panels 74 and a second portion of the guides are received in the delivery columns 15b. This allows the sidewalls or panels 74 to provide a seamless transition from the delivery column 15b to the chute 62 of the inventory handling station assembly 60.

A conveyor system 76 transports the storage bin or container from the supply zone 64 to the access station 66 and subsequently to the buffer zone 70 where the storage bin or container is vertically accumulated to be picked up by a load handling device operative on the grid framework structure 14b and either returned to its original destination in the grid framework structure or a new destination in the grid framework structure. In the particular embodiment of the present invention, the conveyor system 76 comprises multiple conveyors units, namely an entry conveyor unit 78, at least one access conveyor unit 80 and an exit conveyor unit 82, and arranged to transport the storage bin or container from the supply zone 64 to the buffer zone 70 via the access station 66. The storage bin or container is paused at the access station 66 which functions as a pick station or a restocking station. The multiple conveyor units are arranged adjacent to each other or connected to each other such that a storage bin is transported from one conveyor unit to an adjacent conveyor unit as it travels along the conveyor system 76.

In the embodiment of the present invention, the entry conveyor unit 78 is arranged in the supply zone 64, more specifically the entry conveyor unit 78 is arranged in each of the one or more chutes 62. As shown in FIG. 7, the entry conveyor unit 78, the at least one access conveyor unit 80 and the exit conveyor unit 82 are on the same level. Similarly, the exit conveyor unit 82 is arranged in the buffer zone 70. Each conveyor unit may comprise any suitable arrangement of belt(s), chain(s) and/or rollers well known in the art of conveyor systems. In the particular embodiment of the present invention shown in FIG. 7, the entry conveyor unit 78, the at least one access conveyor unit 80 and the exit conveyor unit 82 comprises a plurality of roller conveyors for transporting storage bins or containers along a path on the conveyor system 76. The entry conveyor unit 78, the at least one access conveyor unit 80 and the exit conveyor unit 82 are arranged such that the path or the transport direction of the storage bins or containers can follow a U-shaped path as shown in FIG. 8 or an L-shaped path as shown in FIG. 9. As shown in FIG. 7, the conveyor system 76 is mounted on a roller frame. The entry conveyor unit 78 and the exit conveyor unit 82 are arranged to accommodate a single storage bin on top.

As demonstrated in FIG. 8, the path or transport direction of the entry conveyor unit 78 may be parallel and opposite to the path or transport direction of the exit conveyor unit 82 such that the path or transport direction of the at least one access conveyor unit 80 is perpendicular or orthogonal to the path or transport direction of both the entry conveyor unit 78 and the exit conveyor unit 82. In other words, the storage bin or container travel in a U-shaped path along the conveyor system 76, i.e. the storage bin changes direction twice along the conveyor system. Optionally and as shown in FIG. 9, the path or transport direction of the exit conveyor unit 82 extends longitudinally in the same transport direction of the at least one access conveyor unit 80, i.e. the exit conveyor unit 82 is an extension of the at least one access conveyor unit 80. Here, the path or transport direction of the entry conveyor unit 78 is perpendicular or orthogonal to the path or transport direction of both the at least one access conveyor unit 80 and the exit conveyor unit 82 such that the storage bin or container travels in an L-shaped path along the conveyor system 76, i.e. the storage bin or container changes direction once as they travel from the supply zone to the buffer zone. In the particular embodiment of the present invention as shown in FIGS. 6 and 7, the conveyor system is arranged such that the path or transport direction of the storage bin can follow both a U-shaped path and an L-shaped path along the conveyor system 76. The combination of the U-shaped path and the L-shaped path permits multiple storage bins or containers to be queued at the buffer zone 70 before being lifted towards the grid for subsequent retrieval by a load handling device operative on the track or rail on the grid. This allows multiple storage bins or containers to be processed through the access station 66 in comparison to prior art solutions. The combination of the U-shaped path and the L-shaped path allows for a relatively small width of the inventory handling station assembly for processing multiple storage bins or containers at the access station 66 in comparison to prior art solutions.

The at least one access conveyor unit 80 extends between the entry conveyor unit 78 and the exit conveyor unit 82 and can comprise multiple conveyor units arranged adjacent each other in the horizontal plane such that a storage bin or container is transported from one conveyor unit to an adjacent conveyor unit along the access conveyor unit 80. In the particular embodiment shown in FIGS. 6 and 7, the at least one access conveyor unit 80 comprises six conveyor units. Alternatively, the at least one access conveyor unit 80 can be a single conveyor unit that extends between the entry conveyor unit 78 and the exit conveyor unit 80. Typically, one or more of the rollers of the at least access conveyor unit 80 and optionally, the entry conveyor unit 78 and/or exit conveyor unit 82 comprises an integrated driving motor (not shown), whilst the remaining rollers may be connected by belts (not shown) to the driving roller, or they may be passive.

An additional conveyor unit 84 (see FIGS. 8 and 9) positioned adjacent the entry conveyor unit 78 and/or the exit conveyor unit 82 is integrated into the at least one access conveyor unit 80. In the particular embodiment of the present invention, the additional conveyor unit or the directional change conveyor unit 84 comprises one or more rollers or belts or chains laterally disposed between or which interdigitate between the rollers of the at least one access conveyor unit and are arranged to be driven transversely to the transport direction of the at least one access conveyor unit (see arrows in FIGS. 8 and 9). The additional conveyor unit or directional change conveyor unit 84 is lowered or raised by a lifting mechanism (not shown) relative to the rollers of the at least one access conveyor unit 80 such that in the raised position, the directional change conveyor unit 84 is in contact with a storage bin causing the directional change conveyor unit 84 to drag or pull the storage bin from the entry conveyor unit 78 onto the at least one access conveyor unit 80. This is shown by the arrows in FIG. 8 and FIG. 9. Once on the at least one access conveyor unit 80, the storage bin or conveyor can then be transported along the at least one access conveyor unit 80 to the buffer zone 70 via the access station 66. A similar set up is shown at the buffer zone 70, in which a second directional change conveyor unit 84 is arranged to transport a storage bin or container onto the exit conveyor unit 82 in the buffer zone 70. Whilst the particular embodiment describes a lifting mechanism to engage the directional change conveyor unit 84 with a storage bin on the entry conveyor unit 78 and on the exit conveyor unit 82, other directional change conveyor units commonly known in the art of conveyor systems are applicable in the present invention such as conveyor balls, rail mounted trolleys.

As shown in FIG. 6, the access station 66 comprises a work surface 86 above the at least one access conveyor unit 80 and having an opening 88 allowing an operator to gain access to a storage bin or container on the at least one access conveyor unit 80 below. As discussed above, an operator can pick or supply a desired item(s) to or from the storage bin in the access station 66 depending on whether the access station 66 functions as a pick station or a restock station. In the case where the at least one access conveyor unit 80 comprises multiple conveyor units, the access conveyor unit 90 (shown by the light shading in FIGS. 8 and 9) arranged below the opening 88 in the work surface 86 comprises a weighing cell or alternatively, the weighing cell can be positioned anywhere along the at least one access conveyor unit 80. The weighing cell is connected to the at least one access conveyor unit 80 and arranged to weigh a storage bin in the access station 66. The weighing cell can be a load cell or any other weighing cell commonly known in the art. A control panel (not shown) at the front of the access station 66 displays the weight of the storage bin as items are picked from or loaded into the storage bin. For example, when operated as a pick station, the weighing cell measures the weight of the storage bin or container as one or more items are picked from the storage bin. The storage control and communication system discussed above is used monitor the inventory or stock of a particular item by recording the weight of the storage bin as items are picked from the storage bin. This enables the storage control and communication system to keep track of the contents of each of storage bins or containers stored within the grid framework structure. When the contents of a particular storage bin or container having a particular attribute or SKU is running low as measured by the weighing cell and recorded by the storage control and communication system, a notification is sent to an operator, e.g. via the control panel, to restock the storage bin.

When operated as a restock station or supply station, fresh stock is loaded into the storage bin in the access station 66 before it is transferred into the grid framework structure and stored therein until needed for fulfilment of an order. A storage bin or container may be brought to a drop off port by an overhead load handling device operative on the grid framework structure 14b and lowered to the inventory handling station assembly 60 where one or more of items can be loaded into the storage bin or container at the access station 66. The storage bin or container is weighed at the access station 66 each time items are loaded into the storage bin. The weighing scale prevents the storage bin being overloaded in the access station 66 as this may prevent the bin lifting device in the buffer zone 70 and/or the lifting mechanism of the load handling device being able to lift the storage bin or container. The motors of the lifting mechanism of the load handling device and/or the bin lifting device are rated to a carry a predetermined weight. Once the predetermined weight has been reached, the display on the control panel will provide a notification to an operator, i.e. via the display panel, that the weight of a particular storage bin or container has been reached and no further items can be added to the storage bin before it is transported to the buffer zone 70. Additionally or alternatively, the lifting mechanism of the one or more bin lift devices can comprise a weighing cell to weigh a storage bin or container as it is lifted towards the grid framework structure 14b.

To prevent one or more storage bins or containers backing up at the access station 66, the buffer zone 70 comprises one or more bin lift devices 68 so as to allow one or more storage bins to be vertically accumulated in the buffer zone 70. The bin lift device 68 comprises lifting arms and a lifting mechanism. In the particular embodiment of the present invention, the bin lift device 68 comprises a pair of or two lifting arms 92. The space between the lifting arms 92 are wide enough to allow the exit conveyor unit 82 to pass between the lifting arms 92 as the lifting arms 92 descend past the exit conveyor unit 82. In use, the lifting arms 92 descends to a lowermost level below the exit conveyor unit 82 such that the lifting arms 92 can engage with a bottom wall of the storage bin on the exit conveyor unit. The storage bin or container is lifted from a lowermost position on the exit conveyor unit 82 to an uppermost positon towards the grid framework structure 14b such that the storage bin is vertically spaced apart from the exit conveyor unit 82. This allows a second storage bin or container to enter the exit conveyor unit 82 and be vertically accumulated below the storage bin or container there above. The storage bin at the uppermost position waits until a load handling device operative on the grid at an upper level is able to retrieve the storage bin or container through a pick-up port via a retrieval column 15c. More specially, a grabber device of the load handling device is able to grab the storage bin or container at the uppermost level and lift the storage bin or container into a container receiving space of the load handling device. A sensor detects the retrieval of the storage bin at the uppermost level which sends a signal to a control system or controller to lower the lifting arms 92 below the second storage bin or container resting on the exiting conveyor unit 82 which is subsequently lifted to the uppermost level, allowing for a third storage bin or container queuing at the buffer zone to enter the buffer zone 70 via the exit conveyor unit 82. The whole process is repeated as storage bins or containers enter the buffer zone 70.

A bin lift device 68 can comprise multiple pairs of lifting arms 92 that are vertically spaced apart so as to allow multiple storage bins to be vertically accumulated at different heights in the buffer zone 70. For example, a first pair of lifting arms can be arranged to lift a first storage bin to a first height, a second pair of lifting arms can be arranged to lift a second storage bin to a second height and so on. This allows multiple storage bins to be vertically accumulated at different heights in the buffer zone 70. Added to this, one or more bin lift devices 68 can be arranged adjacent to each other. To conserve space and to reduce the footprint of the inventory handling station assembly 60, a first bin lift device can be arranged at the end of the at least one access conveyor unit 80 so that a storage bin or container can be transported along the same path of the access conveyor unit 80 into the first bin lifting device. If the first bin lifting device is fully occupied, the storage bin can be instructed to change direction into an adjacent second bin lift device, e.g. in a direction perpendicular to the transport direction of the at least one access conveyor unit. This can be achieved by controlling the directional change conveyor unit 84 adjacent the buffer zone 70 to transport the storage bin into the second bin lift device. Here the control system or a separate controller monitors the occupancy of the first bin lift device and the second bin lift device and decides whether to transport the storage bin into the first bin lift device or the second bin lift device depending on their occupancy. The occupancy of the bin lift device 68 is determined by one or more sensors to detect the presence of a storage bin or container in the bin lift device. Examples of sensors include but are not limited to proximity sensor such as light sensors.

By having multiple bin lift devices 68 allows a greater throughput of the storage bins or containers through the inventory handling station assembly 60. In both cases, the storage bin follows either a U shaped path or an L-shaped path from the access station 66 depending on whether the first bin lifting device is occupied or the second bin lifting device is occupied. The number of bin lifting devices 68 is not limited to two and the exit conveyor unit 82 can be arranged to allow multiple bin lift devices 68 to be at the receiving end of the at least one access conveyor unit 80.

As with the one or more chutes 62 in the supply zone 64, the one or more bin lift devices 68 comprise at least two guides 94 that guide the storage bin or container vertically as it is lifted by the lifting arms 92. In the particular embodiment shown in FIG. 7, four guides 94 are shown wherein a portion of the guides at the uppermost level are received in a grid column or the retrieval column 15c where the pick-up port is located. Equally, brackets 96 can be used to connect the uppermost part of the bin lifting device 68 with the retrieval column 15c of the grid framework structure 14b (see FIG. 7). The brackets 96 comprise guides to guide the storage bin or container into the retrieval column. This allows the bin lift device 68 to be a separate part of the grid framework structure above—hence, the ability to be retrofitted to an existing grid framework structure. The one or more bin lift devices 68 comprises sidewalls or panels 74 mounted externally to at least a portion of the guides to enclose the bin lift devices 68 and prevent components of the bin lift device 68 such that the lifting arms 92 being exposed.

In a known fulfilment centre or distribution centre 100 as shown in FIG. 10, items and stock required to fulfil customer orders are located in containers or storage bins 10. One or more storage bins or containers 10 are stacked in grid columns 15a (first grid columns). The grid columns vary in height depending on the number of storage bins or containers stacked in the grid columns. A known fulfilment centre also include various other stations including but are not limited to a charge station for charging the recharge battery powering the load handling devices on the grid, a service station to carry out routine maintenance of the load handling device. To accommodate anyone of the stations or a combination thereof, a separate area 102 is provided adjacent the grid framework structure 14. Typically, the separate area 102 is provided by incorporating a mezzanine 104 supported by vertical beams in amongst adjacent grid framework structures 14 and is generally a standalone structure. The mezzanine 104 provides a tunnel to accommodate, for example, a pick stations and/or anyone of the above described stations. FIG. 10 shows a grid framework structure 14 either side of a tunnel created by the mezzanine 104 suitable for accommodating the inventory handling station assembly of the present invention. The grid 22 from adjacent grid framework structures extend across the top of the mezzanine 104 to connect to a grid 22 either side of the mezzanine 104. The inventory handling station assembly is located below the grid columns 15b, 15b (second grid columns) that extends across the top of the mezzanine 104 such that the grid columns 15b, 15c cooperate with one or more vertical chutes 62 in the supply zone 64 and one or more bin lift devices 68 in the buffer zone 70. As is apparent from FIG. 10, the grid columns 15b, 15c at the top of the mezzanine 104 is shallower than the grid columns 15a either side of the mezzanine 104, i.e. can only accommodate one or two layers of containers in a stack. Also shown in FIG. 10, the mezzanine is supported by separate vertical beams. The vertical beams supporting the mezzanine butts up against the grid framework structure 14 either side of the mezzanine.

One or more load handling devices 30 are operative on the grid or grid structure 14. The load handling device 30 preferably comprises a control unit which receives control signals from a radio communications unit of the control system or a central control system concerning information on where to pick up and deliver a container or tote in the grid framework structure. For the purpose of the present invention, the grid framework structure, the one or more load handling devices operative on the grid framework structure and the control system for controlling the operation of the load handling device on the grid framework structure forms the storage and retrieval system. The storage and retrieval system and the inventory handling station assembly form part of the fulfilment/restocking system.

FIG. 11 is a flow chart 105 showing the steps where the access station 66 of the inventory handling station assembly 60 operates as a pick station. In a picking station, the storage bin or containers is lifted from a stack containing inventory items needed to fulfil a customer order by a load handling device 30. Once lifted by the load handling device 30, the storage bin or container is delivered by the load handling device to a drop-off port 106 by which the load handing device is instructed by the control system to lower the storage bin or container down a chute 62 into the supply zone 108. At the supply zone 64, the storage bin is transported by the conveyor system 76 where it is paused at the access station 66 which doubles up as a pick station 110. At the pick station, the required inventory item or items may be manually or robotically removed from the storage bin or container and placed in a delivery container 112; the delivery container forming part of the customer order, and is filled for dispatch at the appropriate time. The process of picking is repeated until the required items to fulfil an order has been completed 114. Once the picking stage has been completed, the storage container is transported to the buffer zone where it is vertically accumulated 116. As discussed above, depending on the occupancy of the one or more bin liftings devices, the storage bin or container is lifted to an uppermost position where it wait until it is retrieved by a load handling device operative on the grid or grid structure 118. The whole process shown in FIG. 11 is repeated as more storage bins or containers are lowered into the inventory handling station assembly to fulfil multiple orders of one or more items.

The access station 66 of the inventory handling station assembly 60 can also double up as a decant or restocking station where palletized items or other batches of items of a particular characteristic SKU arrive at the inventory handling station assembly and loaded into the storage bin or container. FIG. 12 is a flow chart 119 depicting the steps of restocking the storage bin or containers with inventory or items. A storage bin or container needing restocking with one or more items can be retrieved from the storage in the grid framework structure, and delivered to the inventory handling station assembly via one or more chutes in the supply zone 120. Alternatively or in addition, empty storage bins or containers can be added at the access station which is then added into the storage and retrieval system. At the access station, items of a characteristic SKU are loaded into the storage bin or container 122. The characteristic SKU of the items and the identification of the storage bin is stored in an inventory database which is accessible by the control system or storage control and communication system (see FIG. 13). Decanting or loading of the container at the access station is continued until it is completed 124. At the access station, a weighing cell or load cell measures the weight of the storage bin or container on the at least one access conveyor unit as items are loaded into the storage bin or container 125. Steps 124 and 125 are carried simultaneously or contemporaneously as items are decanted into the storage bin or container. As discussed above, the weighing cell is used to determine whether the storage bin or container has reached a predetermined weight above which would exceed the safe lifting capability of the lifting mechanism of the load handling device and/or the bin lifting device 126. Once the required amount of items are loaded into the storage bin or container and the weight of the storage bin or container is below or equal to the predetermined weight, the at least one conveyor unit is allowed to move to the buffer zone where it is queued before it is retrieved by a load handling device operative on the grid structure 128, 130. However, if the weight of the storage bin or container is above the predetermined weight, the operator removes one or more items from the storage bin or container until the weight of the storage bin or container reaches the desired or is below the predetermined weight 127. The whole process of restocking the storage bins or containers is repeated with different items or SKUs.

FIG. 13 is a block diagram of the components of the fulfilment system 132 according to an embodiment of the present invention. The components of the fulfilment system shown in FIG. 13 is applicable whether the access station is a pick station and/or a restocking station. The operation of the load handling device 30 on the grid is controlled by the control system or controller 134 and comprises one or more processors 136, a memory (e.g. read only memory and random access memory) 140 and a communication bus 138. The control system 134 is communicatively coupled 143 to one or more load handling devices 30 operational on the grid via a communication network over a wireless transmitter/receiver (not shown). The communication network, for example, can be a local area network (LAN), a wide area network (WAN) or any other type of network. In the particular embodiment, the load handling device preferably comprises a control unit which receives control signals from a radio communications unit of the control system. The one or more processors of the control system can execute instructions stored in the ROM and/or RAM to control the movement of one or more load handling devices operational on the grid. The control system 134 is also communicatively coupled 145 to the inventory handling station assembly 60. The control system 134 receives signals associated with the weight of a storage bin or container in the access station. The control system 134 can also control the conveyor system 76 and/or bin lift device 68 to control movement of the storage bins or containers as they are processed through the access station 66 and/or queued in the buffer zone 70. As is commonly known the in the art, one or more sensors, e.g. position sensors or proximity sensors, are distributed along the path of the conveyor system 76 and are used to monitor the position of the storage bin or container at different stages along the conveyor system 76, e.g. the different zones (supply zone, access station and the buffer zone) in the inventory handing station. A user interface (not shown) communicatively coupled to the control system 134 is provided at the access station to acknowledge the picking or loading of one or more items to or from a storage bin or container. For example, an operator acknowledges that an item of an order is picked from a storage bin and placed into a delivery container by the user interface (not shown). The user interface sends a signal to the control system 134 that an item of the order has been fulfilled. This is repeated until all of the items of an order has been fulfilled. The weight of the storage bin or container can be correlated to an identification of the storage bin or container. The identification can also corresponding to the type of items or a SKU of the items stored in the storage bin or container. To identify each of the storage bins or containers, preferably, each of the storage bins or containers comprises a label (e.g. electronic label) readable by a user interface for establishing an identity of each of the storage bins or containers. Optionally, the label can comprise a barcode, 1-D barcode, 2-D barcode, or a QR code or a RFID tag. The user interface can be a push button or a graphical user interface (GUI). The identification of the storage bin or container is correlated to the contents of the storage bin or container by its characteristic attribute or SKU.

Data associated with one or more orders are stored in an order database 142. Each of the orders stored in the order database 142 comprises one or more items requested by one or more customers. Each of the items in an order can be characterised by a distinct attribute. As discussed above, the attribute can be a SKU commonly known in the art which is characteristic of the item such as manufacturer, brand, style, colour and/or size. Data associated with the inventory or stock in the storage and retrieval system is stored in an inventory database 144. The data includes the attribute of the items characterised by their corresponding SKU stored in each of the storage bins or container and the position of the storage bins or containers within the grid framework structure. The positon of the storage bins or containers in the grid framework structure can be represented by Cartesian coordinates in three dimensions to represent the container's position and a container depth (e.g. container at (X, Y, Z), depth W). Optionally, the control system 134 can correlate one or more items in an order to a corresponding attribute of the items stored in the inventory database 144.

The order database 142 is dynamically updated via communication coupling 147 with the control system 134 as more orders are received. Likewise, the inventory database 144 is dynamically updated via communication coupling 149 with the control control system 134 each time stock is added or removed from the storage bins or containers. Each time an order for one or more items is made, the control system 134 accesses the inventory database 144 to determine whether anyone of the items are available, the quantity of the item in the inventory database 144 and the location or position of the one or more storage bins or containers to fulfil an order in the storage retrieval system, i.e. grid framework structure. The control system 134 via the one or more processors 136 instructs the one or more load handling devices 30 to locate and retrieve one or more storage bins or containers containing the relevant items to fulfil an order.

Typically, delivery containers containing fulfilled orders are transported via a conveyor, forklift or other means to a vehicle loading for dispatch to any ordering customer. At the dispatch facility, packed containers associated with one or more assembled orders may be sorted and delivered to transport means, such as trucks, for delivery to customers. Whilst such a process is adequate where the timescale for the fulfilment and dispatch of an order is typically over a period of one or more days, such as a process is not ideal where orders need to be fulfilled and dispatched over a period of one or more hours or even less otherwise known as immediacy dispatch. Immediacy dispatch has become increasingly popular for the fulfilment of convenience grocery items such as milk, cheese or bread, i.e. staple grocery items. Here such orders are picked and either delivered to the customer or dispatched over the counter from receipt of the order. Coupled with the development of online shopping this has led to a plethora of different e-commerce models for the purchase of goods for immediacy dispatch online. These range from the click and collect model where customers purchasing or selecting goods online can either pick the goods up in a store of choice or at a centralized collection location or a home delivery service where goods are delivered directly to the customer's premises. To provide an immediacy dispatch of orders, the fulfilment system can be adapted to include a bagging station where the delivery containers comprise one or more bags.

FIG. 14a shows a bagging station 146 adjacent the inventory handling station assembly 60 of the present invention where one or more items to fulfil an order packed into one or more bags 146. The bagging station 146 can be positioned in close proximity to the access station 66 such that items picked from one or more storage bins or containers in the access station 66 can be transferred to one or more bags 148 at the bagging station 146. Picking can done manually by hand or by a robot as taught in GB2524383 (Ocado Innovation Limited). One or more bags 148 at the bagging station 146 are separated or held in discrete compartments or spaces in the bagging station by one or more partitions 150. The one or more bags 148 are supported on an elevated surface (e.g. a table 152) that is divided into separate compartments by the partitions 150. Each of the partitions 150 can represent an individual order or part of an order.

The bagging station 146 allows a small number of items, typically convenience items, to be immediately packed into one or more bags 148 from the access station 66 before being dispatched to a customer. The process of fulfilling an order by the picking station described above with reference to FIG. 11 above still applies. The storage and retrieval system can be made on a smaller scale to cater for a smaller group of items, typically staple or convenience items, e.g. bread, egg, milk etc. An operator at the bagging station 146 acknowledges one or more items being picked and transferred to a bag by a user interface. The bags comprising the fulfilled order can be dispatched over the counter directly to a customer rather than being processed through a delivery facility. Alternatively, with the growth of the provision of click and collect, the bags comprising the fulfilled orders can be deposited into electronically controllable lockers for subsequent collection by a customer or courier. Multiple partitions 150 at the bagging station 146 allows multiple orders to be fulfilled for immediate dispatch. Each of the compartments provided by the partitions 150 comprises a user interface 154 to acknowledge picking of an item of an order from a storage bin or container.

To identify the identity of the storage bin or container as the load handling device lowers the storage bin or container into the supply zone, more specially, the at least one chute comprises at least one input device, more specifically, a reader, e.g. a linear and/or matrix barcode reader. The one or more storage bins comprises a label readable by the at least on input device for establishing the identity and the contents of each of the one or more storage bins as it travels down the at least one chute. The label on one or more of the storage bins can be a barcode, 1-D barcode, 1 2-D barcode, or a QR code or a RFID tag. FIG. 14b shows a rear view of the inventory handling station assembly 60 shown in either FIG. 6 or FIG. 14a of the present invention. In the particular embodiment shown in FIG. 14b, three chutes 62 are shown in the supply zone 64. Each of the chutes 62 comprises a reader or scanner 65 to scan a label of a storage bin or container as it is paused on the entry conveyor unit. The signal from the reader 65 is used by the control system to identify the storage bin or container and its content in the inventory handling station assembly.

To make sure that the load handling device has been instructed to retrieve the correct storage bin or container to the inventory handling station assembly 60, the signal from the reader 65 can also make sure that the storage bin or container delivered by the load handling device correlates with the identification of the storage bin or container in the inventory handling station assembly 60, e.g. provides an electronic handshake between the inventory handling station assembly 60 and the load handling device instructed to deliver a storage bin or container. Typically, the position or location of each of the storage bins or containers within the grid framework structure are stored in the inventory database. When a load handling device is instructed to retrieve a storage bin or container to fulfil an order, the load handling device is instructed to move to the location on the grid where the desired storage bin or container is located. The storage bin or container is then transported to the inventory handling station assembly. The identification of the storage bin or container is read by the reader 65 at the supply zone. This is compared with the identification of the storage bin or container instructed by the load handling device to see if they correlate so as to make sure that the correct storage bin or container has been delivered to the inventory handling station assembly 60. To fulfil an order, the control system via one or more processors instructs one or more load handling device operative on the grid to retrieve one or more storage bins or containers containing the relevant items from the storage and retrieval system. In some cases, a load handling device may have to repeatedly retrieve the same storage bin or containers throughout a day to fulfil multiple orders requesting the same item. This is particularly exacerbated when the items are general convenience items or staple everyday items such as milk, cheese, bread etc. In another aspect of the present invention, the control system 134 in communication with the order database 142 and/or the inventory database 144, is instructed by one or more processors to collate or group multiple orders that share a common item type or SKU. By grouping or collating multiple orders where one or more types of items of each of the orders are shared or common between the multiple orders, increases the efficiency of fulfilling multiple orders and thereby, allow the fulfilment system to meet the criteria for immediacy dispatch. An organisational unit stored in the memory organises the orders so that multiple orders share one or more common items. The process of collating or grouping multiple orders based on at least one item of the multiple orders being common between the multiple orders can be described by the flowchart 160 shown in FIG. 15. In a first step, the control system accesses data associated with multiple orders in the order database 162. The control system via one or more processors compares a first order of one or more items with a second order of one or more items to determine whether there are one or more items are common between the first order and the second order 164. If one or more items are common between the first order and the second order 166, the control system collates or groups the first order with the second order 168. If there are no common items, the control system revisits the order database to look for other orders which have items in common else, the control system will proceed to process the order as described with reference to FIG. 11 above.

Orders that are collated, the control system via the one or more processors accesses the inventory database 170 to locate and subsequently, retrieve a storage bin or container where the contents of the storage bin or container storing the relevant item are located 172. As discussed above, the inventory database comprises data associated with a list items and their characteristic attribute or SKU together with the position of storage bins or containers storing the items. The sequence of the steps of collating the first and the second order 168 and accessing the inventory database 170 is not limited to what is shown in FIG. 15 and can be switched around. At the access station, the contents of the storage bin or container is shared between the first order and the second order. By sharing a storage bin or container between multiple orders, the ability of the fulfilment system to fulfil multiple orders is increased. Typically, items that are common between multiple orders are more prominent where the orders contain convenience items or staple items.

In a further improvement to increasing the efficiency of the fulfilment system, one or more storage bins or containers 10b, 10c can store two or more different items or SKUs 176a, 176b as shown in FIGS. 16 and 17. The different items can be separated in the storage bins or containers by dividers 174. Here, the control system collates a plurality of orders that share multiple items in common. For example, an algorithm identifies multiple items that are frequently requested together, i.e. analyses the frequency distribution of ordered items. These typically include convenience or staple common everyday items having a relatively short sell buy date, e.g. milk, dairy products etc. One or more storage bins or containers 10b, 10c can be organised in the storage and retrieval system whereby each of the one or more storage bins or containers can store different items that are frequently ordered together, i.e. have a high frequency distribution of request. Groups of orders can be collated or grouped together based on groups of items that are common or shared between each of the orders. By grouping or collating multiple orders whereby multiple different items are common between each of the orders and retrieving a single storage bin or container storing the different items, the contents of the single storage bin or container can be shared amongst multiple delivery containers, e.g. bags, associated with a plurality of orders. Thus, in addition to retrieving separate storage bins or containers for each item in multiple orders, the control system can locate and retrieve a storage bin whose contents can be shared amongst multiple orders. This not only increases the efficiency of fulfilling multiple orders since the control system is not separately required to retrieve storage bins or containers for each item in an individual order but also dramatically reduces the number of storage bins or containers that are required to be retrieved to fulfil an order. The fulfilment efficiency increases, the greater number of different items or SKUs that are stored in a given storage bin as shown in FIG. 17.

By storing different items in one or more storage bins or containers such that each of the one or more storage bins or containers store multiple different items as shown in FIG. 16 or 17, equally increases the likelihood that the contents of anyone of the storage bins or containers in storage can be shared amongst multiple delivery containers, e.g. bags, associated with a plurality of orders. For example, a storage bin or container comprising one or more items having a characteristic first attribute or SKU and one or more items having a characteristic second attribute or SKU, wherein one or items of the first attribute or the second attribute can be shared amongst a plurality or orders, more specifically delivery containers associated with a plurality of orders.

Table 1 is a hypothetical example of a group of five orders. Each of the orders labelled, Order 1, 2, 3, 4, and 5, comprises an order of five different items or SKUs having a characteristic attribute labelled A, B, C, D, E, and F. Here, Order 1, 2, 3 and 5 share the same requested item B. Orders 1, 3 and 5 additionally share the same requested item D, i.e. common items B and D. To increase the efficiency of fulfilling the five orders, the control system collates or groups Orders 1, 2, 3 and 5 such that when fulfilling Orders 1, 2, 3, and 5, the control system can retrieve a single storage bin or container storing Item B where the contents of the storage bin or container can be shared amongst Orders 1, 2, 3 and 5. This is further increased where a single storage bin or container stores both items of type B and D such that the contents of a single storage bin or container can be shared amongst Orders 1, 3, and 5. This would greatly speed up the fulfilment of the five orders since less storage bins or containers would need to be repeatedly retrieved from the storage and retrieval system (grid framework structure) in order to fulfil multiple orders.

| Order | Item 1 | Item 2 | Item 3 | Item 4 | Item 4 |
|---|---|---|---|---|---|
| 1 | C | B | F | G | D |
| 2 | A | J | E | B | K |
| 3 | B | D | L | O | R |
| 4 | U | T | P | V | W |
| 5 | B | R | A | K | D |

Table 1 is a hypothetical example of a group of five orders

The invention claimed is:
1. An inventory handling station assembly for a storage and retrieval system, the storage and retrieval system including a grid framework structure 14 having:
a plurality of upright columns lying in one or more vertical planes and arranged to form a plurality of grid columns for one or more containers to be stacked between and be guided by the plurality of upright columns in a vertical direction, the plurality of upright columns being interconnected at their top ends by a first set of grid members extending in a first direction and a second set of grid members extending in a second direction, the second set of grid members running transversely to the first set of grid members in a substantially horizontal plane to form a grid having a plurality of grid cells or grid spaces; and the first and the second set of grid members supporting a first and a second set of tracks respectively at an upper level of the grid framework structure for a load handling device to move one or more containers on the grid framework structure, wherein the inventory handling station assembly comprises:
i) a supply zone including at least one vertical chute configurable to cooperate with at least one upright column, the at least one vertical chute having a first opening for receiving a container when lowered by at least one load handling device through a grid cell and a second opening to allow the container to exit from the supply zone;
ii) a buffer zone for vertically accumulating one or more containers, the buffer zone including multiple bin lift devices, each of the multiple bin lift devices being arrangeable to upwardly lift a container towards the grid such that, in use, the container is retrievable by least one load handling device;
iii) an access station intermediate of the supply zone and the buffer zone to enable access to one or more containers exiting the supply zone; and
iv) a conveyor system configured to convey one or more containers from the supply zone to the buffer zone via the access station,
wherein the conveyor system comprises an entry conveyor unit, an exit conveyor unit and at least one access conveyor unit,
wherein the entry conveyor unit being arranged in the supply zone and arranged to transport a container in a first transport direction from the second opening of the at least one vertical chute to the least one access conveyor unit,
the exit conveyor unit being arranged in the buffer zone and arranged to transport a container from the at least one access conveyor unit to the buffer zone in a second transport direction, and
the at least one access conveyor unit being arranged to transport a container from the supply zone to the buffer zone via the access station in a third transport direction.

2. The inventory handling station assembly of claim 1, wherein the at least one access conveyor unit comprises:
multiple adjacent conveyor units arranged to transport a container horizontally from the supply zone to the buffer zone via the access station.

3. The inventory handling station assembly of claim 1, comprising:
a work surface arranged above the at least one access conveyor unit, the work surface having an opening allowing access to a container on the at least one of the multiple conveyor units.

4. The inventory handling station assembly of claim 1, wherein the at least one vertical chute comprises:
at least two vertical guides for guiding a container vertically along the at least one vertical chute, each of the at least two vertical guides being configured to be receivable in a grid column.

5. A fulfilment/restocking system comprising:
A) a storage and retrieval system having a grid framework structure, said grid framework structure including:
   a) a plurality of upright columns lying in one or more vertical planes and arranged to form a plurality of grid columns for one or more containers to be stacked between and be guided by the plurality of upright columns in a vertical direction, the plurality of upright columns being interconnected at their top ends by a first set of grid members extending in a first direction and a second set of grid members extending in a second direction, the second set of grid members running transversely to the first set of grid members in a substantially horizontal plane to form a grid having a plurality of grid cells or grid spaces; the first and the second set of grid members supporting a first and a second set of tracks respectively at an upper level of the grid framework structure for a load handling device to move one or more containers on the grid framework structure;
   b) one or more containers, each of the one or more containers including one or more items characterised by an attribute; and
   c) one or more load handling devices remotely operated to move the one or more containers stored in the grid framework structure, each of the one or more load handling devices including:
      i) a wheel assembly for guiding the load handling device on the grid of the grid framework structure;
      ii) a container-receiving space located above the grid; and
      iii) a lifting device arranged to lift a single container from a stack into the container-receiving space; and
B) an inventory handling station assembly as defined in claim 1, the one or more load handling devices being remotely operated to move the one or more containers stored in the grid framework structure to and/or from the inventory handling station assembly.

6. The fulfilment/restocking system of claim 5, wherein the plurality of grid columns comprises:
a first set of grid columns and a second set of grid columns, wherein the first set of grid columns are arranged to store one or more containers in a stack, and wherein the inventory handling station assembly is arranged below the second set of grid columns such that the at least one vertical chute and each of the multiple one bin lift devices are arranged below a respective grid column of the second set of grid columns so that, in use, a load handling device operative on the upper level of the grid framework structure can lower a container down the at least one vertical chute through the respective grid column, and each of the multiple bin lift devices is operative to lift a container to be picked up into the container receiving space of a load handling device through the respective grid column.

7. The fulfilment/restocking system of claim 6, wherein the second set of grid columns comprises:
at least one delivery column and at least one retrieval column, the at least one chute being arranged below the at least one delivery column and each of the multiple bin lift devices being arranged below the at least one retrieval column.

8. The fulfilment/restocking system of claim 6, comprising:
a bagging station, the bagging station including a table having a surface for supporting one or more bags; and
at least one user interface in communication with a bagging station control system.

9. The fulfilment/restocking system of claim 8, wherein the table is divided into one or more spaces by one or more partitions, each of the one or more spaces including the at least one user interface.

10. The fulfilment/restocking system of claim 8, comprising:
a plurality of electronically controllable lockers, each of the plurality of electronically controllable lockers including a compartment that is sized to accommodate the one or more bags.

11. The fulfilment/restocking system of claim 8, wherein the at least one bin lift device comprises:
a first bin lift device and a second bin lift device, the control system being configured to instruct the conveyor system to transport a container to the first bin lift device or the second bin lift device depending on an occupancy of the first bin lift device and the second bin lift device.

12. The fulfilment/restocking system of claim 11, comprising:
one or more sensors in the first bin lift device and the second bin lift device for determining the occupancy of the first bin lift device and the second bin lift device.

13. The fulfilment/restocking system of claim 6, wherein the storage and retrieval system comprises:
a control system having one or more processors and memory storing instructions that when executed by the one or more processors in response to receiving a plurality of orders will cause the one or more processors:
   i) to group or collate the plurality of orders based on at least one attribute of the one or more items being common between the plurality of orders;
   ii) to generate signals to instruct the load handling device to retrieve a first container storing the one or more items common to the plurality of orders;
   iii) to generate signals to instruct the load handling device to lower the first container down the at least one vertical chute via the at least one grid column;
   iv) to instruct the conveyor system to transport the first container to the access station such that the one or more items common to the plurality of orders will be transferred to a plurality of delivery containers associated with the plurality of orders; and
   v) to instruct the conveyor system to transport the first container to the buffer zone.

14. The fulfilment/restocking system of claim 13, wherein the control system is configured to cause the one or more processors to execute instructions:
   v) to generate signals to instruct the load handling device to retrieve a second container storing the one or more items common to the plurality of orders;
   vi) to generate signals to instruct the load handling device to lower the second container down the at least one vertical chute via the at least one grid column;
   vii) to instruct the conveyor system to transport the second container to the access station such that the one or more items common to the plurality of orders will be transferred to the plurality of delivery containers associated with the plurality of orders; and
   viii) to instruct the conveyor system to transport the second container to the buffer zone.

15. The fulfilment/restocking system of claim 14, wherein the control system is configured to cause the one or more processors to execute instructions to generate signals to instruct the one or more load handling devices to retrieve the first container and/or the second container from the buffer zone via the at least one grid column.

16. The fulfilment/restocking system of claim 13, wherein the first container comprises:
   one or more items of a first attribute and one or more items of a second attribute, and wherein the one or more items of the first attribute and/or the one or more items of the second attribute are common between the plurality of orders.

17. The fulfilment/restocking system of any of claim 13, wherein the storage and retrieval system comprises:
   an order database comprising:
   data associated with a plurality of orders of one or more items, wherein the control system is configured to access the order database to group or collate the plurality of orders based on at least one attribute of the one or more items being common between the plurality of orders.

18. The fulfilment/restocking system of claim 13, wherein the control system is configured to receive and execute instructions to record a weight of one or more containers in the access station.

19. The inventory handling station of claim 1, wherein the multiple bin lift devices comprises a first bin lift device and a second bin lift device, the first bin lift device being configured to receive a storage container in a direction parallel to the third transport direction and the second bin lift device is configured to receive a storage container in a direction perpendicular to the third transport direction.

20. The inventory handling station assembly of claim 19, wherein the at least one access conveyor unit comprises:
   a load cell for weighing a container.

21. The inventory handling station of claim 1, wherein the occupancy of the first bin lift device and the second bin lift device is determined by one or more sensors in the first bin lift device and the second bin lift device.

22. A method of fulfilling a plurality of orders by a fulfilment/restocking system, each of the plurality of orders including one or more items, the method comprising:
   i) organizing the plurality of orders so that a group of the plurality of orders share one or more items having at least of attribute common to each of the plurality of orders in the group;
   ii) identifying a first container including the one or more items having at least of attribute common to each of the plurality of orders;
   iii) instructing one or more load handling devices to retrieve the first container storing the one or more items from a grid framework structure;
   iv) lowering the first container into a supply zone of the grid framework structure via one or more vertical chutes;
   v) transporting the first container to an access station;
   vi) transferring the one or more items from the first container to a plurality of delivery containers associated with the plurality of orders;
   vii) transporting the first container to a buffer zone;
   viii) lifting the first container towards a grid of the grid framework structure; and
   ix) instructing the one or more loading handling devices operative on the grid to retrieve the first container from the buffer zone and return the first container to the grid framework structure.

23. The method of claim 22, comprising:
   i) identifying a second container including the one or more items having at least one of attribute common to each of the plurality of orders;
   ii) instructing the one or more load handling devices to retrieve the second container storing the one or more items from the grid framework structure;
   iii) lowering the second container into the supply zone via the at least one vertical chute;
   iv) transporting the second container to the access station;
   v) transferring the one or more items from the second container to the plurality of delivery containers associated with the plurality of orders;
   vi) transporting the second container to the buffer zone;
   vii) lifting the second container towards the grid; and
   viii) instructing the one or more loading handling devices operative on the grid to retrieve the second container from the buffer zone and return the second container to the grid framework structure.

24. The method of claim 22, wherein the first delivery container and/or the second delivery container is a bag.

25. The method of claim 24, comprising:
   transporting the one or more bags to one or more electronically controllable lockers.

* * * * *